United States Patent
Engel et al.

(10) Patent No.: US 10,670,383 B2
(45) Date of Patent: Jun. 2, 2020

(54) CALIBRATING AND OPERATING ROTARY DEVICES, IN PARTICULAR FOR ROTATING PROBE HEADS AND/OR PROBES OF COORDINATE MEASURING MACHINES

(75) Inventors: Thomas Engel, Aalen (DE); Dominik Seitz, Schwaebisch Gmuend (DE); Rainer Sagemueller, Aalen (DE); Fabian Holzwarth, Adelmannsfelden (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 936 days.

(21) Appl. No.: 14/131,607

(22) PCT Filed: Jul. 8, 2011

(86) PCT No.: PCT/EP2011/061684
§ 371 (c)(1),
(2), (4) Date: Apr. 28, 2014

(87) PCT Pub. No.: WO2013/007286
PCT Pub. Date: Jan. 17, 2013

(65) Prior Publication Data
US 2014/0236520 A1   Aug. 21, 2014

(51) Int. Cl.
*G01C 17/38*   (2006.01)
*G01B 5/00*   (2006.01)
(Continued)

(52) U.S. Cl.
CPC ........... *G01B 5/0002* (2013.01); *G01B 5/008* (2013.01); *G01B 21/042* (2013.01); *G01D 5/24452* (2013.01)

(58) Field of Classification Search
CPC .... G01B 5/0002; G01B 5/008; G01B 21/042; G01D 5/24452
(Continued)

(56) References Cited

U.S. PATENT DOCUMENTS 6,410,910 B1   6/2002   Feichtinger
7,797,981 B2 *   9/2010   Vasiloiu ............ G01D 5/24452
73/1.79
(Continued)

FOREIGN PATENT DOCUMENTS

CN   1500202 A   5/2004
CN   101583851 A   11/2009
(Continued)

OTHER PUBLICATIONS

Geckeler Ralf D, Fricke Andreas, and Elster Clemens, Calibration of Angle Encoders Using Transfer Functions, IOPScience, Sep. 20, 2006, vol. 17 No. 10, Institute of Physics Publishing, United Kingdom.

*Primary Examiner* — Michael P Nghiem
(74) *Attorney, Agent, or Firm* — Laurence A. Greenberg; Werner H. Stemer; Ralph E. Locher

(57) ABSTRACT

A measuring arrangement is calibrated for determining rotational positions of a rotary device that has a first part and a second part which can be rotated relative to the first part about a rotational axis. Rotational positions of the first part relative to the second part and/or rotational positions of the second part relative to the first part are detected using a plurality of sensors distributed about the rotational axis. A respective measurement signal corresponding to each detected rotational position is generated such that redundant information on the rotational positions of the first part and the second part relative to each other is provided. The redundant information on the rotational position(s) are analyzed such that effects of a translational movement of the first and the second part relative to each other are corrected, the translational movement running transverse to the extension of the rotational axis.

14 Claims, 10 Drawing Sheets

(51) Int. Cl.
*G01D 5/244* (2006.01)
*G01B 21/04* (2006.01)
*G01B 5/008* (2006.01)

(58) Field of Classification Search
USPC .......................................................... 702/95
See application file for complete search history.

(56) References Cited

U.S. PATENT DOCUMENTS

| | | | |
|---|---|---|---|
| 8,031,334 | B2 | 10/2011 | Lippuner |
| 9,341,500 | B2* | 5/2016 | Lippuner ........... G01D 5/24452 |
| 2001/0025427 | A1 | 10/2001 | Lotze |
| 2004/0003647 | A1* | 1/2004 | Nashiki ................. B25J 9/1692 |
| | | | 73/1.79 |
| 2004/0107063 | A1 | 6/2004 | Weilenmann |
| 2008/0148808 | A1 | 6/2008 | Vasiloiu |
| 2010/0039656 | A1 | 2/2010 | Lippuner et al. |
| 2010/0101104 | A1* | 4/2010 | Grzesiak .............. G01B 21/042 |
| | | | 33/502 |
| 2011/0040514 | A1 | 2/2011 | Kunzmann et al. |
| 2012/0222465 | A1 | 9/2012 | Lippuner |
| 2014/0167745 | A1* | 6/2014 | Held .................... G01B 21/045 |
| | | | 324/207.12 |

FOREIGN PATENT DOCUMENTS

| | | | | |
|---|---|---|---|---|
| CN | 101688766 | A | | 3/2010 |
| CN | 101918792 | A | | 12/2010 |
| DE | 19907326 | A1 | | 8/2000 |
| EP | 0325924 | A1 | | 8/1989 |
| EP | 1923670 | A1 | | 5/2008 |
| EP | 1944582 | A1 | | 7/2008 |
| WO | WO 2009152962 | | * | 12/2009 |
| WO | 2011064317 | A2 | | 6/2011 |
| WO | WO-2013007285 | A1 * | 1/2013 | .......... G01B 21/045 |
| WO | WO2015022398 | | * | 2/2015 |

* cited by examiner

CALIBRATING AND OPERATING ROTARY DEVICES, IN PARTICULAR FOR ROTATING PROBE HEADS AND/OR PROBES OF COORDINATE MEASURING MACHINES

BACKGROUND OF THE INVENTION

Field of the Invention

The invention relates to a method for calibrating a measuring arrangement for determining rotational positions of a rotary device that has a first part and a second part, which can be rotated relative to the first part about a rotational axis. The invention also relates to a method for operating a rotary device that has a measuring arrangement for determining rotational positions. The rotary device is, in particular, a component part of a coordinate measuring machine that is designed for measuring coordinates of a workpiece, hereinafter CMM for short. Furthermore, the invention relates to a calibrating arrangement for calibrating said measuring arrangement and to the rotary device.

In US 2001/0025427 A1, for example, a description is given of rotary devices for coordinate measuring machines that have two rotational degrees of freedom. The rotational axes of the rotary device are approximately perpendicular to one another and make it possible in this way to bring a stylus that is attached to the rotary device into different positions over a wide range with differing alignment of the stylus. However, the invention is not restricted to rotary devices with two rotational degrees of freedom. Rather, the scope of the invention also even includes a rotary device with just one rotational degree of freedom, i.e. the two parts of the rotary device are rotatable relative to one another about a rotational axis. The invention also comprises rotary devices with more than two rotational degrees of freedom of movement.

The use of styluses and probe heads on CMMs is not only known from US 2001/0025427 A1. The workpiece to be measured is probed by styluses or other probes, i.e. a probing element of the probe makes contact with the surface of the workpiece. For various measuring tasks, it is favorable here if the alignment of the probe with a rotary device can be varied. However, it is important in this respect to know the alignment, and consequently the rotational position, exactly and/or to be able to set it reproducibly. At least in the case of conventional CMMs, the alignment of the probe or the corresponding rotational position of the parts of the rotary device must be taken into consideration in the determination of the coordinates of the probed point on a surface. Corresponding calculations are disclosed for example by the cited US 2001/0025427 A1.

However, the invention is not restricted to rotary devices that serve the purpose of rotating probes for probing workpieces mechanically. Optical probes or other measuring devices of a CMM that are used in the measuring of coordinates of a workpiece can be coupled to a rotary device, so that their alignment can be changed by a corresponding rotational movement of the rotary device. In particular, the coordinate measuring device may be an arrangement with one or more sensors that are used for determining the position, alignment and/or deflection of a probe from a position of rest. Such an arrangement is also referred to as a probe head, to which in turn a probe may be coupled. However, as an alternative, the sensor system of the probe head may also be integrated in the rotary device.

Rotary devices usually have an integrated sensor that is capable of measuring the rotational position. A known measuring principle is described for example in EP 1 923 670 A1. Accordingly, it is a general principle of the scanning of a periodic scale division that a scanning head with a sensor unit scans one or more periods of the scale division of a measuring body on the other part of the rotary device. The rotary devices according to the present invention may also have at least one sensor that detects a rotational position of a first part of the rotary device relative to the second part of the rotary device, the sensor detecting in particular markings on a measuring body that move through the detectable range of the sensor during a rotational movement of the rotary device. In this case, the markings may be for example markings in the form of lines that extend in a radial direction with respect to the rotational axis or that extend parallel to the rotational axis. Corresponding measuring bodies are also referred to as graduated disks. Such markings are usually detected by optical sensors. Ideally, there are a multiplicity of markings distributed around the rotational axis at the same angular intervals from one another.

Alternatively, other markings on the measuring body may be used for detecting the rotational movement. Possible, for example, are magnetic markings, provided for instance by an arrangement with magnetic elements distributed around the rotational axis. The corresponding sensor for detecting the magnetic markings may be for example a magnetoresistive sensor. However, it is also possible to use Hall sensors or other sensors that are capable of detecting the strength or direction of a magnetic field.

However, the invention is not restricted to rotary devices that have an angle measuring device which detects markings on a measuring body. Rather, the measuring body may alternatively have for example at least one magnet, so that a corresponding magnetic field is rotated during the rotational movement of the rotary device about the rotational axis or, conversely, a rotatable part of the rotary device is rotated relative to the stationary magnetic field. At least one sensor detects the magnetic field and the rotational position is determined therefrom. One conceivable configuration has a plurality of magnetic field sensors that are distributed around the rotational axis of the rotary device. Each of these magnetic field sensors is capable of determining the position of a magnetic field present at the given time at the magnetic field sensor. Furthermore, a measuring body with at least one magnet is provided. If the two parts of the rotary device that are rotatable relative to one another are rotated, the direction of the magnetic field changes at all the magnetic field sensors. It is theoretically possible to determine the rotational position by just a single such magnetic field sensor. For reasons of accuracy, however, multiple magnetic field sensors are used, and consequently redundant information concerning the rotational position is obtained and evaluated. Consequently, calibration of the rotary device allows a more accurate, and in particular more accurately reproducible, value to be determined for the rotational position.

In the case of the sensor system with magnetic field sensors, components of the rotary device and also components of other devices may change the magnetic field of the measuring body. This happens depending on in which rotational position the rotary device is located. With reference to the parts of the rotary device itself, the effect of the components can be largely eliminated by calibration. By contrast, the effect of components of other devices, which are only arranged in the vicinity of the rotary device when the rotary device is being used for its intended purpose, cannot be eliminated by calibration.

Errors also occur in the case of the aforementioned sensor system with markings distributed around the rotational axis and corresponding sensors for detecting the markings. Components of external devices admittedly do not influence the position of the markings relative to one another (at least not if only small mechanical forces act from outside on the rotary device). However, the spacing of the markings is not completely constant or known. In turn, the effects can however be largely eliminated by using additional sensors that produce redundant information. This is described in the aforementioned EP 1 923 670 A1. In this case, the additional sensors may either just be used in the calibration or also be used at least partially during the operation of the rotary device for its intended purpose.

A corresponding calibrating method is described in the publication by Ralf B. Geckeler et al. "Calibration of angle encoders using transfer functions", published in Meas. Sci. Technol. 17 (2006) 2811-2818. It is also described therein that an additional measuring system may be installed on the rotary device for the calibration. Geckeler describes a method for calibrating a rotary device in which a plurality of reading heads at varying angular intervals from one another are distributed around the rotational axis. Differences in the angles of the rotational positions are formed from the measuring signals supplied by the reading heads. Furthermore, a Fourier transform is performed and a transfer function that describes how the Fourier coefficients of the angular intervals can be calculated from the Fourier coefficients of the differences in angles is applied. Estimated values of the Fourier coefficients for each difference in angle are then combined, with appropriate weighting. The error of the measuring system to be calibrated is obtained from a sum of the Fourier coefficients over the differences in angles. Geckeler thus observed a reduction in the error by a factor of up to four.

BRIEF SUMMARY OF THE INVENTION

It is an object of the present invention to provide a method for calibrating a measuring arrangement, a method for operating a rotary device and a calibrating arrangement and a rotary device of the type mentioned at the beginning, the error of the measurement of the rotational position of the first and the second part of the rotary device relative to one another being further reduced.

A fundamental concept of the present invention is that the rotary device does not perform an ideal rotational movement about the rotational axis. Resultant errors are referred to in particular as wobble, axial run-out and radial run-out. In the case of wobble, a deviation of the alignment of rotatable and/or rotationally symmetrical parts of the rotary device from the expected or desired rotational axis is a possible cause. An example of a reason for an axial run-out is a disk-shaped component of the rotary device, which may in particular have the markings for the determination of the rotational position, and is ideally intended to be of a planar configuration in a plane perpendicular to the rotational axis. In practice, however, there are deviations from the planar path. During the rotational movement about the rotational axis, an upward and downward movement then occurs, if the direction of the rotational axis is taken to be the vertical direction. One reason for a radial run-out is a deviation of the rotational bearing between a bearing that is centered exactly on the rotational axis and a bearing that lies to one side thereof. Lying exactly on the rotational axis is understood here as meaning that the rotational movement of the respective component is performed exactly about the rotational axis. Another possible reason for a radial run-out is a not exactly rotationally symmetrical form of a component that is rotatable about the rotational axis.

In all of these cases and also in further cases, movement components that may be referred to as translation (that is to say linear movement in a straight line) occur in the rotational movement of the rotary device. Consequently, an ideal rotational movement about the rotational axis of the rotary device does not take place, but instead movements transverse to the rotational axis and/or in the direction of the rotational axis (this includes movements parallel to the rotational axis) also occur, at least in partial regions of the rotational movement about the rotational axis.

The suggested solution is thus to evaluate and/or process the information supplied by a plurality of sensors, which respectively detect a rotational position of the first and the second part of the rotary device relative to one another, while taking into consideration the effect of translational movements. In this case, the various sensors are distributed around the rotational axis. This should be understood as meaning that they supply measuring signals of the rotational position simultaneously or quasi-simultaneously, but at different locations in the circumferential direction of the rotational axis. In particular, the sensors may be distributed over the circumference of a fixed part of the rotary device and at the same time be oriented radially inwardly or outwardly, in order to detect there (on the inside or outside) a measuring body rotating past them in the rotational movement. As described above, the measuring body may for example have markings spaced apart from one another in the circumferential direction and/or generate a magnetic field. The plurality of sensors may, however, also be oriented in directions other than radially inwardly or radially outwardly. For example, the measuring body may have markings that can be viewed from above or from below and the sensors may therefore be oriented in a direction that runs approximately parallel to the rotational axis. It is also possible that the sensors are not arranged on a fixed part of the rotary device but on a part of the rotary device that is rotatable about the rotational axis, and accordingly the measuring body or measuring bodies is/are arranged on a fixed part of the rotary device or form(s) this part. Combinations of the two principles mentioned are also possible, i.e. some of the sensors are arranged on the fixed part and some of the sensors are arranged on the rotatable part of the rotary device. Furthermore, it should be pointed out that all that matters is the relative rotatability of the first and the second part of the rotary device about the rotational axis. Which part is rotatable and which part is fixed is therefore merely a question of perspective. In each case, a coordinate system that is based on the first or second part and from the viewpoint of which the rotational movement of the rotary device is observed can be defined.

Quasi-simultaneous detection is understood as meaning that the rotational positions are detected one after the other at such short time intervals that, as a result, no great error of the overall detection of the rotational position occurs. For example, the measuring signals of the various sensors may be sampled cyclically and individually one after the other. If the frequency of the cyclical sampling is great enough, no appreciable error occurs.

In the evaluation and/or processing of the measuring signals supplied by the plurality of sensors, it is taken into consideration that the sensors supply redundant information concerning the rotational position, but the translational movements transverse to the rotational axis occurring during the rotational movement are detected by the sensors in differing ways. If, for example, two of the sensors lie at positions opposite one another with respect to the rotational axis, i.e. at an angular interval of 180° in the circumferential direction, and a translational movement occurs in a direction that runs transversely to the line joining the two sensors, one sensor detects this movement in a way that leads to a measuring signal which appears to indicate a rotational movement in a direction about the rotational axis. By contrast, the other sensor detects the translational movement in a way that appears to indicate a rotational movement about the rotational axis in the opposite direction. For example by forming the sum of the corresponding measured values or measuring signals of the two sensors, the translational movement can be eliminated from the entirety of the measuring signals. However, it is also possible to detect the translational movement by for example the rotational movement taking place at the same time being eliminated from the measuring signals or eliminated from the measured values. If there are not just two sensors, but for example three or four sensors, which are distributed around the rotational axis, not only a translational movement in a direction transverse to the rotational axis can be detected and taken into consideration, but also translational movements in a direction running transversely to this first direction can be detected. In this case, this second direction likewise runs transversely to the rotational axis. In particular, therefore, any kinds of radial run-out are detectable and can be taken into consideration. If, furthermore, such an arrangement with a plurality of sensors is not only distributed around the rotational axis at one axial position of said axis but there is likewise such a sensor arrangement also at another axial position of the rotational axis, preferably at a relatively great distance from the first axial position, wobble can also be detected and/or taken into consideration.

Preferably, the same measuring signals that are also evaluated for the determination of the rotational position are processed and/or evaluated when taking into consideration the translational movements. These are therefore in particular not additional measuring signals for the determination of a reference rotational position and/or for other purposes. In the case of the markings mentioned that are distributed around the axis of rotation (for example a graduated disk with markings in the form of lines), the translational movement is detected, determined and or eliminated from the same signals with which the markings running past are detected (for example the counter reading of the markings running past or the pulse signal for each marking running past). In the case of the aforementioned magnetic field sensors, a changing of the direction of the magnetic field at the location of the respective magnetic field sensor is caused by a translational movement transverse to the rotational axis. The measured direction of the magnetic field may therefore likewise be used for determining and/or eliminating the translational movement. In this case, as mentioned above, the translational movement can only be determined and/or eliminated with the aid of the entirety of the information from multiple sensors.

Proposed in particular is a method for calibrating a measuring arrangement for determining rotational positions of a rotary device that has a first part and a second part, which can be rotated relative to the first part about a rotational axis, wherein:
 rotational positions of the first part relative to the second part and/or rotational positions of the second part relative to the first part are detected by a plurality of sensors, which are arranged distributed around the rotational axis, and a measuring signal corresponding to the detected rotational position is respectively generated, so that redundant information concerning the rotational positions of the first part and the second part relative to one another is obtained,
 the redundant information concerning the rotational position(s) is evaluated in such a way that effects of a translational movement of the first and the second part relative to one another are corrected, the translational movement running transversely to the extent of the rotational axis.

Also proposed is a calibrating arrangement for calibrating a measuring arrangement for determining rotational positions of a rotary device that has a first part and a second part, which can be rotated relative to the first part about a rotational axis, wherein the calibrating arrangement has:
 a plurality of sensors, which are arranged distributed around the rotational axis and are respectively arranged on one of the parts,
 at least one measuring body, which is arranged on the other of the parts and is assigned to at least one of the sensors, the sensor being configured to generate a measuring signal in accordance with a rotational position of the measuring body, and consequently in accordance with the relative rotational position of the first and the second part,
 an evaluation device, which is connected to the sensors for receiving measuring signals of the sensors and is configured to evaluate rotational positions of the first and the second part relative to one another that are detected by the sensors in such a way that effects of a translational movement of the first and the second part relative to one another are corrected, the translational movement running transversely to the extent of the rotational axis.

As mentioned, the fundamental concepts of the present invention may also be applied to the operation of a rotary device, in particular as part of a coordinate measuring machine. In this case, the translational movements are not taken into consideration in the calibration, but directly during the operation of the rotary device.

Also proposed therefore is a method for operating a rotary device, in particular a rotary device as a component part of a coordinate measuring machine for measuring coordinates of a workpiece, wherein the rotary device has a first part and a second part, which can be rotated relative to the first part about a rotational axis, and wherein
 rotational positions of the first part relative to the second part and/or rotational positions of the second part relative to the first part are detected by a plurality of sensors, which are arranged distributed around the rotational axis, and a measuring signal corresponding to the detected rotational position is respectively generated, so that redundant information concerning the rotational positions of the first part and the second part relative to one another is obtained,
 the redundant information concerning the rotational position(s) is evaluated in such a way that effects of a translational movement of the first and the second part relative to one another are corrected, the translational movement running transversely to the extent of the rotational axis.

Accordingly proposed is also a rotary device, in particular a rotary device as a component part of a coordinate measuring machine for measuring coordinates of a workpiece, wherein the rotary device has a first part and a second part, which can be rotated relative to the first part about a rotational axis, and wherein the rotary device also has:

a plurality of sensors, which are arranged distributed around the rotational axis and are respectively arranged on one of the parts, at least one measuring body, which is arranged on the other of the parts and is assigned to at least one of the sensors, the assigned sensor being configured to generate a measuring signal in accordance with a rotational position of the measuring body, and consequently in accordance with the relative rotational position of the first and the second part, an evaluation device, which is connected to the sensors for receiving measuring signals of the sensors and is configured to evaluate rotational positions of the first and the second part relative to one another that are detected by the sensors in such a way that effects of a translational movement of the first and the second part relative to one another are corrected, the translational movement running transversely to the extent of the rotational axis.

The evaluation device may, in particular, be only connected to the sensors by way of signal lines and in this case do not have to be mechanically connected to the parts of the rotary device, i.e. in particular do not have to be attached to the parts. It is therefore also possible to speak of an arrangement comprising the rotatable parts, the sensors and the evaluation device.

In particular, the coordinate measuring machine has the rotary device and the sensor arrangement in any desired configuration that is described in this description and/or is known to a person skilled in the art.

In particular, the first part and the second part are rotated relative to one another by a rotational movement about a rotational axis and a position and/or alignment of a coordinate measuring device of the coordinate measuring machine is thereby set, the redundant information being obtained from rotational positions of the first part and the second part relative to one another that are detected by the sensors directly before, during and/or directly after the rotational movement, the effects of the translational movement being taken into consideration in a determination of coordinates of a workpiece that is measured by the coordinate measuring device in the set position and/or alignment of the coordinate measuring device.

With respect to the CMM, the following corresponds to this: the first part or the second part of the rotary device is connected to a coordinate measuring device for measuring coordinates of the workpiece, so that a position and/or alignment of the coordinate measuring device can be set by a rotational movement of the first part and the second part relative to one another, the evaluation device being configured to take into consideration the effects of the translational movement of the first and the second part relative to one another in a determination of coordinates of the workpiece that is measured by the coordinate measuring device in the set position and/or alignment of the coordinate measuring device by evaluation of the rotational positions detected by the sensors that have been detected by the sensors directly before, during and/or directly after the rotational movement.

Rotational positions that have been detected by the sensors directly before, during and/or directly after the rotational movement concern the current operation as intended of the rotary device, in particular the coordinate measuring machine, and therefore not the calibration of the sensors. In particular, no comparison of the values of the rotational positions thus obtained with additional measured values of an additional measuring system takes place, as is the case in a variant of the calibration. This, however, includes the case where not always measured values of all the sensors are detected and/or evaluated when taking into consideration the effects of the translational movement during the operation of the rotary device.

It is an advantage of detecting the rotational positions during the current operation of the rotary device that the actually occurring operating conditions of the rotary device, in particular of the CMM, are taken into consideration. "Current operation" does not necessarily mean that the rotational positions during the rotational movement are detected.

For example, the rotary device may be under a mechanical load that leads to a translational movement of the first and the second part relative to one another transverse to the rotational axis, or such a translational movement changes in comparison with the unloaded state. In a calibration without load, such an effect can only be taken into consideration by approximate replication of the loading or by model calculation.

For taking into consideration the translational movement during the current operation of the rotary device, preferably at least three sensors are used, respectively detecting the rotational position. As described in this description with reference to the calibration, the sensors may be distributed unevenly around the rotational axis of the rotary device. In order to be able to obtain the information for taking into consideration the translational movement transverse to the rotational axis during the operation of the rotary device from the plurality of rotational angle sensors, the information concerning which rotational position respectively corresponds to the measuring signal of the rotational angle sensor is used in particular. On account of what is known as the graduation error, in many cases the rotational position cannot in any case be determined, or not determined accurately, from the measuring signals of a single rotational angle sensor if this assignment between the measuring signals of the rotational angle sensor and the rotational position is not known. The term graduation error may be used as a general term for all of the errors of the measuring system, in particular systematic detection errors of the sensor and errors of the measuring body. The term graduation error originally relates to the graduation brought about by a plurality of markings distributed around the rotational axis. The term graduation error may, however, also be referred for example to the described measuring systems with a magnetic field of the measuring body and magnetic field sensors. If only because of the graduation error, a calibration is required. An exception here is an arrangement of rotational angle sensors that have sensors lying opposite one another in pairs with respect to the rotational axis. These pairs of sensors directly measure the error caused by the translation or the translational movement. If, however, the sensors are intended to be used for determining the rotational angles, a calibration with respect to the graduation error is in turn also required, or is preferred.

In order to be able to detect and/or take into consideration the translational movement of the two parts of the rotary device relative to one another transverse to the rotational axis, the calibration with respect to the graduation error may be performed either before current operation or during current operation. Calibration during current operation is understood as meaning in particular that, even during the calibration, the rotary device is in an operational state, in which it can be used for the intended purpose, without having to decouple components from the rotary device, couple components to the rotary device or change the possibilities of movement of the rotary device. Such components are understood as also meaning in particular additional measuring systems that are specifically used for calibration. In particular, the rotary device is in an operational state in which it can be used for the intended purpose if it is ready to be used as part of a coordinate measuring machine.

If the calibration is carried out during the current operation of the rotary device, a rotational movement of the two parts of the rotary device that are rotationally movable relative to one another can be performed in particular in order to determine the assignment of the measuring signals of the individual rotational angle sensors to the actual rotational position. In particular, a complete revolution of the parts with respect to the rotational axis may be performed. Since the graduation error that is attributable to the measuring body acts on the individual sensors in the same way, but in accordance with the angular intervals of the sensors from one another, at least the component of the graduation error that is attributable to the measuring body can in this way be eliminated and/or determined. But also deviations in the measuring signal generation of the various sensors from one another can be eliminated or determined by a complete revolution or almost complete revolution. Furthermore, it is also possible, for example, to perform the evaluation method from the publication by Geckeler or the modifications thereof that are described in this description during the current operation of the rotary device, i.e. at least to evaluate in this way the measuring signals recorded during the current operation of the rotary device.

Taking into consideration the results of the calibration, the translational movement can be detected and taken into consideration during the current operation.

In a variant, the rotary device does not necessarily have more than one sensor for detecting the rotational position (hereinafter also rotational position sensor for short). In this variant, an additional measuring system is provided in order to detect the translational movement of the first and the second part relative to one another transverse to the rotational axis. As a difference from the publication by Geckeler, however, measuring signals supplied by the additional measuring system are generated and evaluated during the operation as intended of the rotary device. The information contained therein concerning the translational movement of the two parts of the rotary device that are movable relative to one another is used for the purpose of correcting measuring signals and/or measured values derived therefrom of the at least one rotational positional sensor with respect to the translational movement.

Proposed in particular is: a method for operating a rotary device, in particular a rotary device as a component part of a coordinate measuring machine for measuring coordinates of a workpiece, wherein the rotary device has a first part and a second part, which can be rotated relative to the first part about a rotational axis, and wherein rotational positions of the first part relative to the second part and/or rotational positions of the second part relative to the first part are detected by at least one sensor and measuring signals corresponding to the detected rotational positions are generated, information concerning a translational movement of the first and the second part relative to one another is detected by an additional measuring system, the translational movement running transversely to the extent of the rotational axis, the information from the additional measuring system is evaluated in such a way that effects of the translational movement of the first and the second part on the measuring signals and/or on measured values of the rotational positions that are obtained therefrom are corrected.

The wording "information from an additional measuring system concerning a translational movement" does not exclude the possibility that the additional measuring system also supplies information concerning the rotational movement of the parts of the rotary device.

Also proposed is a rotary device, in particular a rotary device as a component part of a coordinate measuring machine for measuring coordinates of a workpiece, wherein the rotary device has a first part and a second part, which can be rotated relative to the first part about a rotational axis, and wherein at least one sensor is provided, configured to detect rotational positions of the first part relative to the second part and/or rotational positions of the second part relative to the first part and to generate measuring signals corresponding to the detected rotational positions, an additional measuring system with at least one further sensor is provided, configured to detect information concerning a translational movement of the first and the second part relative to one another, the translational movement running transversely to the extent of the rotational axis, an evaluation device is provided, connected to the sensors for receiving measuring signals of the sensors and configured to evaluate the information from the additional measuring system in such a way that effects of the translational movement of the first and the second part on the measuring signals and/or on measured values of the rotational positions obtained therefrom are corrected.

The rotary device has the two parts that are rotational relative to one another about a rotational axis, the first part and the second part. The wording "the second part is rotated relative to the first part about the rotational axis" should also be understood as meaning that the second part is stationary relative to the external coordinate system and only the first part is rotated. In the relationship of the parts to one another, a rotational movement of the second part relative to the first part nevertheless takes place in this case. In particular, one of the parts is configured to hold either a workpiece or a coordinate measuring device, for example a probe, to allow a rotation of the workpiece or of the coordinate measuring device. Optionally, the rotary device offers additional rotational mobility about a second rotational axis (for example what is known as a rotation/pivot joint with two rotational axes running perpendicularly to one another) or about more than two rotational axes.

In a first embodiment, the one part of the rotary device is configured to hold the workpiece. The other part is configured in particular to be attached to a base of the arrangement and/or to be positioned on a base such that this part is immovable relative to the base and the workpiece can be rotated with the one part relative to the base. For example, the rotary device may be what is known as a rotary table, on or at which the workpiece is arranged in order to be able to be brought into various rotational positions and in order to measure the coordinates thereof in the various rotational positions.

According to a second embodiment, the one part is configured to hold a coordinate measuring device. In this case, the rotary device allows a rotation of the coordinate measuring device, for example relative to an arm (in particular a quill) of a coordinate measuring machine. Known, for example, are what are referred to as rotation/pivot joints, which allow rotational mobility with respect to rotational axes running transversely and in particular perpendicularly to one another.

The detecting of rotational positions of the first part relative to the second part by a plurality of sensors means that each of the sensors detects at least one rotational position and generates a corresponding measuring signal. In particular, each of the sensors detects the rotational position in each of the rotational positions of the first part relative to the second part.

In principle, the rotary device may have at least one measuring body, which interacts with the respective sensor. The measuring body is for example arranged on the first part, or forms the first part, and the sensor is arranged on the second part, or vice versa. Examples were already discussed at the beginning. There may also be multiple measuring bodies, which respectively interact with one or more sensors. In particular, the measuring body may be a first measuring body, which is arranged at a first axial position of the rotational axis, a second measuring body being arranged on the first or second part at a second axial position, at a distance from the first axial position of the rotational axis. Also provided at both axial positions is an arrangement with a plurality of sensors, which are respectively configured to detect a rotational position of the first and the second part relative to one another. The measurement at different axial positions with respect to the rotational axis allows wobble caused by a deviation of the alignment of rotatable and/or rotationally symmetrical parts of the rotary device from the expected or desired rotation axis to be measured.

A rotational position is understood as meaning a position of the first and the second part relative to one another that can be set by rotation about the rotational axis. In particular, depending on the type of construction of the rotary device, it may only be possible for certain, discrete rotational positions to be set, or any desired rotational positions—at least within a continuous range—to be set.

If a reference rotational position is established or can be determined, there corresponds to each rotational position a rotational movement by a rotational angle defined with respect to the rotational axis (i.e. the rotational angle is an azimuth angle of the rotational axis), by which the parts can be rotated relative to one another out of the reference rotational position such that in this way they arrive in the rotational position. At the same time, the rotary device does not have to allow this rotational movement, or not in all operating states. Rather, the rotational movement may also be an imaginary rotational movement.

As mentioned, the multiple sensors are arranged distributed around the rotational axis of the rotary device. As likewise already described in more detail above, this should be understood as meaning that the rotational positions are measured simultaneously or quasi-simultaneously at different angular positions, or that the arrangement of the sensors and of the at least one assigned measuring body is configured correspondingly.

Effects of the translational movement are understood as meaning in particular the aforementioned effects on the measuring signals and measured values of the sensors derived therefrom, to be specific that a measuring signal appears to indicate a rotational movement, but has been caused by a translational movement. Conversely, a rotational movement and a translational movement may compensate one another, so that the sensor does not detect any movement or detects a changed movement. This will be discussed in more detail below.

The aforementioned correction is understood as meaning in particular an elimination of the effects of the translational movement of the first and the second part relative to one another from the measuring signals, from the redundant information and/or from the measured values obtained therefrom. For example, a measuring signal of a sensor or measured values of multiple sensors may be corrected, in particular a counting value that corresponds to an angular position may be incremented or decremented. Alternatively, a measured value obtained from the measuring signal may be corrected, for example increased or reduced in order to correct it.

In particular during the operation of a CMM, a further possibility of correction is that of determining measured values in the measurement of a workpiece with a coordinate measuring device of the CMM while taking into consideration the redundant information. As already described, the redundant information also contains information concerning the translational movement transverse to the rotational axis of the rotary device. If the coordinate measuring device is coupled to the rotary device, and therefore the position and/or alignment of the coordinate measuring device depends on the rotational position of the rotary device and furthermore also depends on the translational movement of the parts of the rotary device, the entire information can be used. This entire information is contained in what is known as the redundant information. The entire information may then be used in particular for the exact determination of the position and/or alignment of the coordinate measuring device.

In particular, it is also possible to determine explicitly the displacement caused by the translational movement and to take it into consideration for the determination of the position and/or alignment of the coordinate measuring device. A special feature of the invention in this respect is that measured values from a plurality of rotational position sensors of the rotary device are used.

In more general terms, it therefore corresponds to a preferred embodiment of the invention to use measuring signals and/or measured values derived therefrom of a plurality of rotational position sensors of a rotary device for determining the translational position in a direction transverse to the rotational axis of the rotary device and also for determining the position and/or alignment of a coordinate measuring device of the CMM.

In the aforementioned variant, in which only at least one rotational position sensor has to be present, but there is an additional measuring system for detecting the translational movement and/or position of the first and the second part of the rotary device, it is possible in particular for the error described above in the detection of the rotational movement by the rotational position sensor to be corrected by using the information from the additional measuring system. For example, in the aforementioned case in which the translational movement appears to be a rotational movement or intensify a rotational movement, the effect on the measuring signals and/or measured values derived therefrom that is produced by the translational movement can be eliminated. In the case where a rotational movement and a translational movement at least partially compensate one another, the measuring signal of a rotational position sensor or the measured value derived therefrom can be corrected such that it reproduces the rotational movement that is actually taking place or being performed. A correction of the rotational movement may also be understood as meaning that a rotational position that has been achieved by a rotational movement or has been achieved by a translational movement is corrected.

As mentioned above, the coordinate measuring device may be, for example, a probe for mechanically probing the surface of a workpiece or an optical probe. In a way known per se, furthermore, at least one coordinate of the workpiece measured by the coordinate measuring device can be determined from the position and/or alignment of the coordinate measuring device.

In the calibration, in particular at least part of the measuring system may be calibrated by obtaining from the redundant information calibrating information that allows actual rotational positions of the first part and the second part relative to one another that do not depend on translational movements of the first and the second part relative to one another and occur reproducibly during rotational movements of the first and the second part relative to one another to be determined from the measuring signals of the respective sensor. The calibrating device can be configured correspondingly.

Optionally, components of the measuring signals and/or the measured values that appear (if a single sensor is considered) to be attributable to a rotational movement but are solely effects of the translational movement of the first and the second part relative to one another can be determined. Conversely, it may also be the case that there are missing components of the measuring signals and/or the measured values, i.e. components that have not been detected by the respective sensor because a translational movement and a rotational movement have at least partially compensated one another as far as the sensor is concerned. These components may also be explicitly determined. It is therefore proposed that in the evaluation there should be determined components of the measuring signals and/or the measured values which, if a single sensor is considered,

- appear to be attributable to a rotational movement of the first part relative to the second part but are solely attributable to a translational movement of the first and the second part relative to one another and/or
- have not been detected by the respective sensor because a translational movement and a rotational movement have at least partially compensated one another as far as the sensor is concerned.

The effects of the components can then be eliminated from the measuring signals, from the redundant information and/or from the measured values.

However, it is not absolutely necessary to determine explicitly the effects of the components mentioned when the correction is to be carried out. In one embodiment of the correction, differences or sums of the measuring signals, of the redundant information and/or of measured values that are obtained from the measuring signals and/or the redundant information are formed, so that effects of the translational movement of the first and the second part relative to one another are eliminated completely or partially (depending on the direction of the translational movement) from the measuring signals, from the redundant information and/or from measured values that are obtained from the measuring signals and/or the redundant information by the forming of differences or forming of sums. Forming of differences or forming of sums is a simple and precise measure for carrying out the correction.

In all cases in which the effect of translational movements of the first and the second part relative to one another is taken into consideration, the invention has the advantage that the accuracy of the measurement of the rotational position of the first and the second part relative to one another can be improved. In particular, for example, in the calibration the accuracy can be improved in comparison with the method that is described in the aforementioned publication by Geckeler.

In particular, it is preferred that pairs of differences or sums of the measuring signals and/or of the measured values obtained therefrom from multiple different sensors (preferably at least three sensors distributed around the rotational axis) are formed and, in this way, and optionally by further method steps (such as for example solving a corresponding system of equations or an optimization calculation), the components mentioned are completely eliminated and/or the corresponding effects are completely eliminated from the redundant information. In more general terms, it is proposed that, respectively for pairs of sensors, differences or sums of the measuring signals, of parts of the redundant information that correspond to the sensors and/or of the measured values are formed and the effects of the translational movement are thereby eliminated completely or partially. If all possible differences for at least three sensors distributed around the rotational axis are formed, the effects of the translational movement can be eliminated completely (i.e. fully). In the case of at least two pairs of sensors lying opposite one another with respect to the rotational axis, the effect of the translational movement can be eliminated directly by forming the sum of the measuring signals or measured values of the sensors lying opposite one another. Examples of both cases mentioned will be discussed further.

According to a first embodiment of the method according to the invention, in the calibration of a measuring device or in the operation of a CMM there is determined a translation vector, which runs perpendicularly to the rotational axis and joins a point on the rotational axis to a center point of a measuring body or of the arrangement of sensors that interact with the measuring body for the purpose of the determination of the rotational position. In other words, the translation vector describes the direction and the amount of the displacement of the relative movement of the first and the second part transverse to the rotational axis from an ideal position. This ideal position would not be left in the case of an ideal rotary device, i.e. no translational movement transverse to the rotational axis would be performed during the rotational movement. The center point of the measuring body is, for example, the center point of the markings of a graduated disk. Alternatively, it may be the center point of the entire magnetic field generated by the measuring body. The center point of the arrangement of sensors is in particular a point with which all of the sensors are aligned. In the ideal case of the rotary device, this point coincides with a point on the rotational axis. In particular, the amount and the direction of the translation vector can be determined from the redundant information.

According to a first exemplary embodiment, the displacement from the ideal position that is caused by the translational movement is determined in the calibration of the measuring device. An evaluation device of the calibrating arrangement may be configured correspondingly. In particular, as described above, differences in the rotational positions detected by the individual rotational position sensors are thereby formed, to be precise either respectively in pairs for two of the rotational position sensors and/or respectively for the rotational position sensors and a reference rotational position. In more general terms, the entire redundant information from the detection of the rotational positions with multiple rotational position sensors is pre-processed in a first step. In a next step, a Fourier transform is performed, for example as described in the aforementioned publication by Geckeler. After performing optional further processing steps (for example the application of a transfer function and/or of weights, as likewise described for example by Geckeler), an error separation or separation of the information with respect to the rotational position and the translational position in a direction transverse to the rotational axis is performed in the frequency domain. After the separation, the component of the rotational position and/or the component of the translational position can be obtained by a transformation back into the spatial domain. The translational position may be expressed in particular as described above by the translation vector. The rotational position is expressed for example with respect to a reference position (known as the zero-degree position).

In a variant of the evaluation method, initially the redundant information is likewise pre-processed, for example as described above. A Fourier transform may also be performed as a subsequent method step. However, this is not absolutely necessary. In any event, a model of the translational movement or of the displacement achieved by the translational movement transverse to the rotational axis is used. A corresponding equation is also specified in the description of the figures for an actual exemplary embodiment. In particular, the amount and the direction of the translation vector may be parameters of the model. The model of the translational movement or displacement is combined with the information concerning the rotational positions that has been detected by the plurality of rotational position sensors. Then the best solution of the model of the translation is found by applying a prescribed optimization algorithm, i.e. the parameter values on which the model depends are optimized. In particular, the optimization may proceed iteratively, parameter values being established in each iteration step and new parameter values being found according to the optimization algorithm for the next iteration step respectively.

The invention makes it possible in particular to separate errors of the measuring system for determining the rotational position from mechanical faults of the rotary device. Apart from the errors caused by a translational movement transverse to the rotational axis, errors caused by a translational movement in the direction of or parallel to the rotational axis have also been mentioned above. For the determination of this translational error, it is possible for example to use at least one further sensor, for example an inductive or capacitive sensor, which measures a distance between the first part and the second part in a direction of the rotational axis. The determination of the translation errors therefore makes it possible in particular to determine the errors of the measuring system and optionally correct them permanently.

The translational errors from the calculation model are used to correct errors in the measured values detected with the plurality of sensors. The errors in the measured values, which are detected with the plurality of sensors, are caused by the translational movement of the first part and the second part relative to each other.

BRIEF DESCRIPTION OF THE SEVERAL VIEWS OF THE DRAWING

Exemplary embodiments of the invention are now described with reference to the appended drawing. In the individual figures of the drawing.

DESCRIPTION OF THE INVENTION

Figure 1:
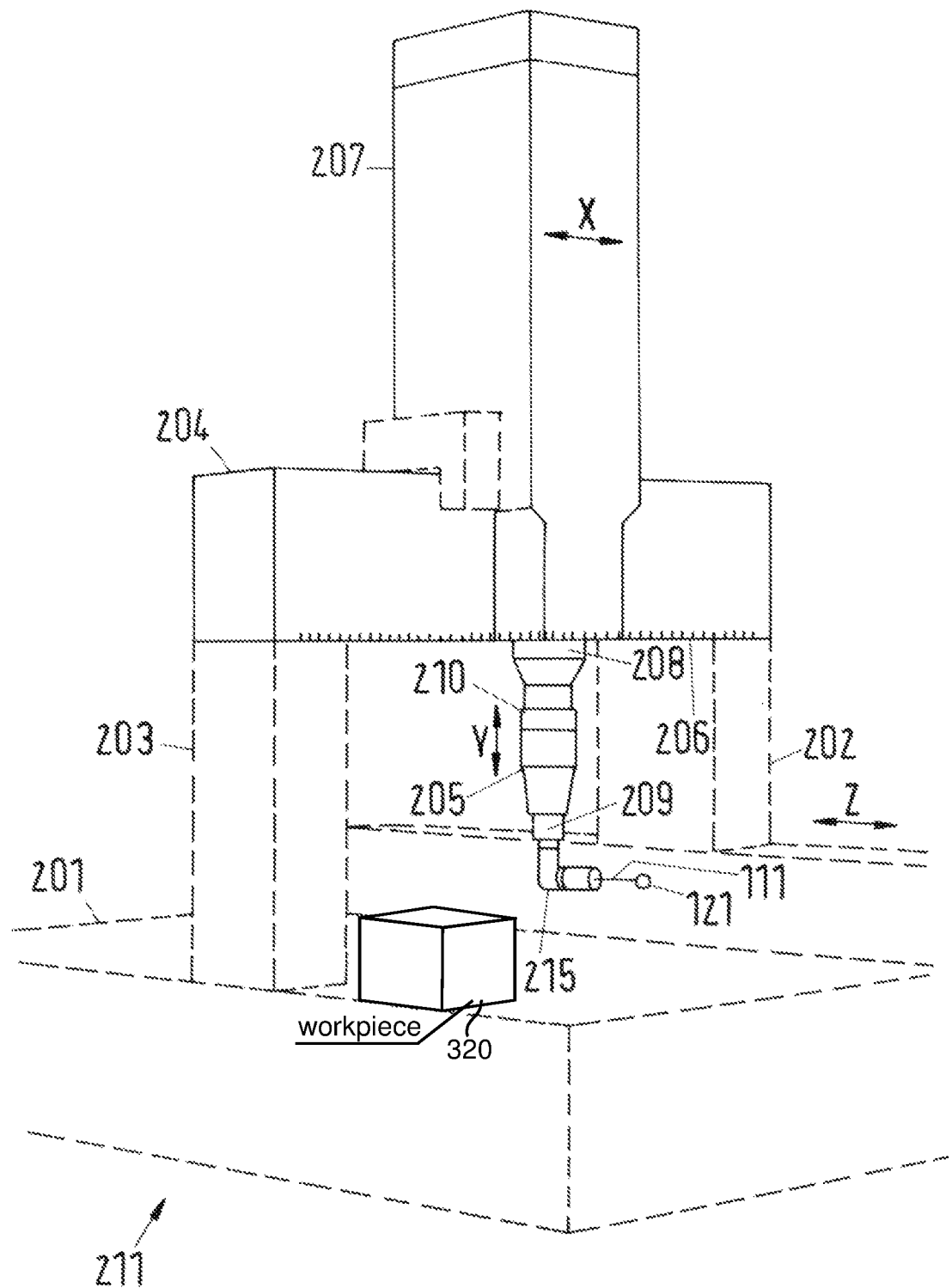
FIG. 1 schematically shows a coordinate measuring machine of a gantry type of construction, to which a probe head can be coupled by way of a rotary device.

The coordinate measuring machine (CMM) 211 of a gantry type of construction that is represented in FIG. 1 has a measuring table 201, over which columns 202, 203 are movably arranged in the Z direction of a Cartesian system of coordinates. The columns 202, 203 together with a transverse beam 204 form a gantry of the CMM 211. The transverse beam 204 is connected at its opposite ends to the columns 202 and 203, respectively. Electric motors that are not represented any more specifically cause the linear movement of the columns 202, 203 in the Z direction. In this case, each of the two columns 202, 203 is for example assigned an electric motor.

The transverse beam 204 is combined with a transverse carriage 207, which is moved on air bearings along the transverse beam 204 in the X direction of the Cartesian system of coordinates. The momentary position of the transverse carriage 207 relative to the transverse beam 204 can be established on the basis of a scale division 206. The movement of the transverse beam 204 in the X direction is driven by a further electric motor.

Mounted on the transverse carriage 207 is a quill 208, which is movable in the vertical direction and at its lower end is connected by way of a mounting device 210 and a rotating device 205 to a coordinate measuring device 209. The coordinate measuring device 209 has an angled-away probe head 215, on which a stylus 111 with a probe ball 121 is removably arranged. The coordinate measuring device 209 may be driven by a further electric motor relative to the transverse carriage 207 in the Y direction of the Cartesian system of coordinates. The electric motors of the CMM allow the probe head 209 to be moved into virtually any desired positions in the region underneath the transverse beam 204. Furthermore, the rotary device 205 can rotate the probe head 215 about the Y axis, so that the stylus 111 can be aligned in different directions. An exemplary workpiece 320 is diagrammatically shown.

Figure 2:
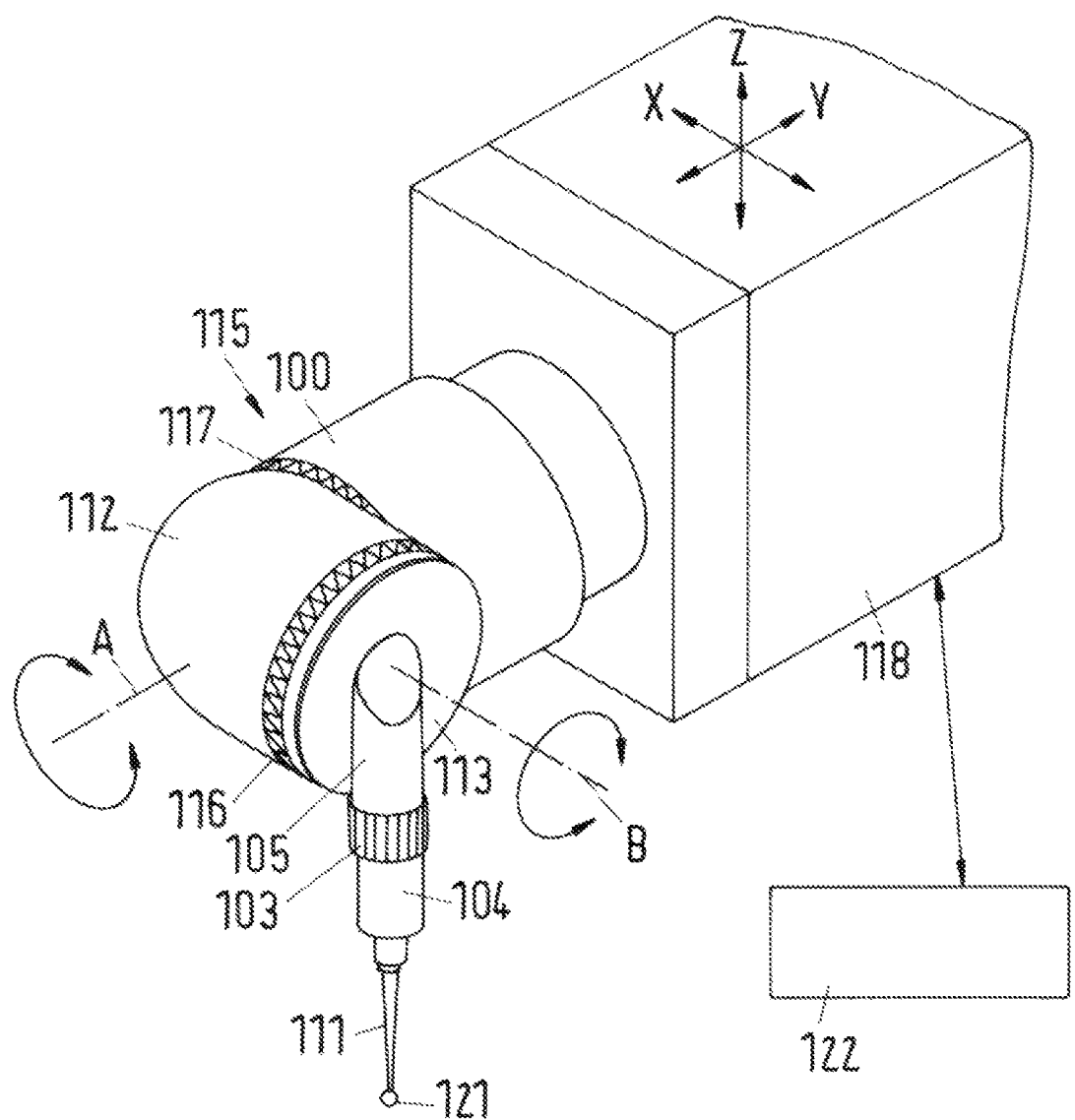
FIG. 2 shows the free end of an arm of a coordinate measuring machine with a probe head coupled on by way of the rotary device with two rotational degrees of freedom of movement.

FIG. 2 shows an arm 118 of a CMM, for example the quill of the CMM that is represented in FIG. 1. Arranged at the free end of the arm 118 is a rotary device 115, which has two rotational degrees of freedom of movement. A first rotational axis A of the rotary device 115 runs approximately as an extension of the longitudinal axis of the arm 118. A second rotational axis B of the rotary device 115 runs perpendicularly to the first rotational axis A. Depending on the rotational position with respect to the first rotational axis, the second rotational axis B therefore points in different directions.

A first part 100 of the rotary device 115 is connected to the arm 118 for rotation therewith. A second part 112 of the rotary device 115 is rotatable relative to the first part 100 about the first rotational axis A. A third part 113 of the rotary device is rotatable relative to the second part 112 about the second rotational axis B.

In the actual exemplary embodiment, the rotary device is what is known as an indexing rotary device, in which only a plurality of prescribed rotational positions can be set. For setting such a rotational position of the second part relative to the first part 100, the second part 112 is disengaged in the axial direction of the first rotational axis A (forward to the left in FIG. 2) and rotated into the desired new rotational position. After that, the second part is engaged again by a movement in the direction of the first rotational axis A. A Hirth serration, which is denoted by the reference numeral 117 and allows the engagement and disengagement, is indicated between the first part 100 and the second part 112. In a corresponding way, the third part 113 is engaged and disengaged, in order to change its rotational position relative to the second part 112. A Hirth serration 116 is likewise indicated between the second part 112 and the third part 113.

Attached to the third part 113 such that it is rotationally fixed relative to it is a shaft 105 with a coupling 103 for the releasable coupling of a probe head 104, while a stylus 111 with a probe ball 121 can likewise be releasably coupled to the probe head 104. Also schematically represented at the bottom right in FIG. 2 is a correction unit 122, which is capable of taking into consideration translational movements of said parts 100, 112, 113 relative to the respective rotational axis A, B. Corresponding sensors of the rotary device 115 are not represented in FIG. 2. They are arranged inside the parts represented.

Figure 3:
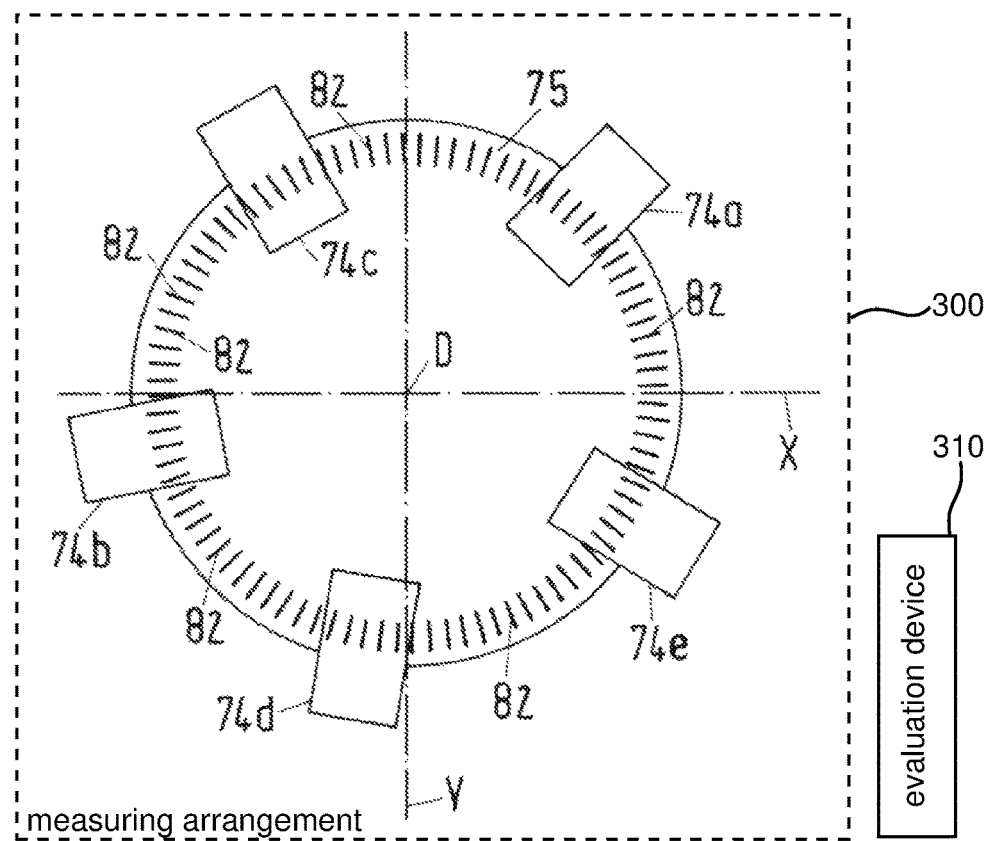
FIG. 3 shows a schematic plan view of a measuring body with a multiplicity of markings in the form of lines, which are distributed around a rotational axis, and with five sensors for detecting the markings, which pass through the range of detection of the sensors during a rotational movement of the measuring body relative to the sensors.

The plan view in FIG. 3 shows a measuring body 75, which has a multiplicity of markings 82 in the form of lines, which in the exemplary embodiment extend in a radial direction in relation to a rotational axis D, i.e. perpendicularly to the rotational axis D. Ideally, the angular interval of the markings 82 in the form of lines is constant, for example with 360 markings the angular interval would therefore be 1°. Such an arrangement of markings in the form of lines on a measuring body is referred to hereinafter as a graduated disk.

FIG. 3 also shows an X axis and a Y axis of a system of coordinates, the X axis and the Y axis running perpendicularly to one another and respectively perpendicularly to the axis of rotation (rotational axis D). Also represented are five sensors 74a, 74b, 74c, 74d, 74e, which are arranged distributed around the rotational axis D and can respectively detect in a range of detection one or more of the markings 82 in the form of lines, in particular if the markings 82 run through the range of detection as a result of a rotational movement. The sensors 74 are arranged (not represented) on a first part of a rotary device, while a second part of the rotary device has the graduated disk. The first and the second part of the rotary device are rotatable relative to one another about the rotational axis or axis of rotation D. Other designs of graduated disks are also possible, in particular with markings in the form of lines that run linearly parallel to the axis of rotation D on the outer circumference of a disk-shaped body. Also possible are corresponding designs that do not not have markings in the form of lines but instead magnetic markings. In this case, the sensors 74 do not optically detect markings in the form of lines, but instead the magnetic field that changes on account of the passing of magnetic markings.

Figure 4:
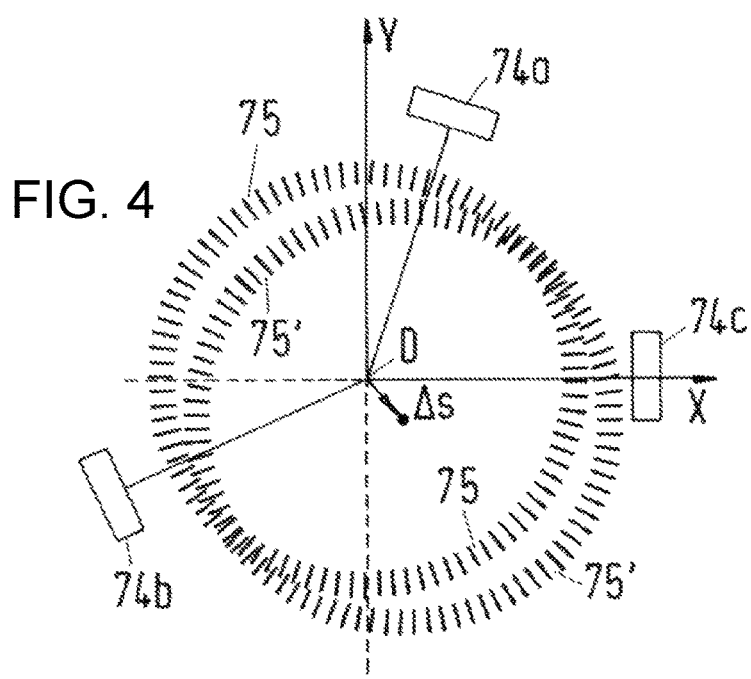
FIG. 4 shows a schematic representation of a translational displacement of a measuring body similar to that in FIG. 3.

FIG. 4 shows the graduated disk 75 according to FIG. 3 or another graduated disk in two different positions. In a first position, the graduated disk is denoted by the reference numeral 75, in a second position it is denoted by the reference numeral 75'. Unlike in FIG. 3, only three sensors 74a, 74b, 74c are represented. The axis of rotation D lies at the center of the graduated disk in the position 75. By contrast, the graduated disk in the position 75' has been displaced by a translation vector $\Delta s$. As a result of the displacement, the graduated disk has been displaced in a translational manner relative to the sensors 74 in a direction that runs perpendicularly to the axis of rotation D, which in FIG. 4 and FIG. 3 is perpendicular to the plane of the figure.

Figure 5:
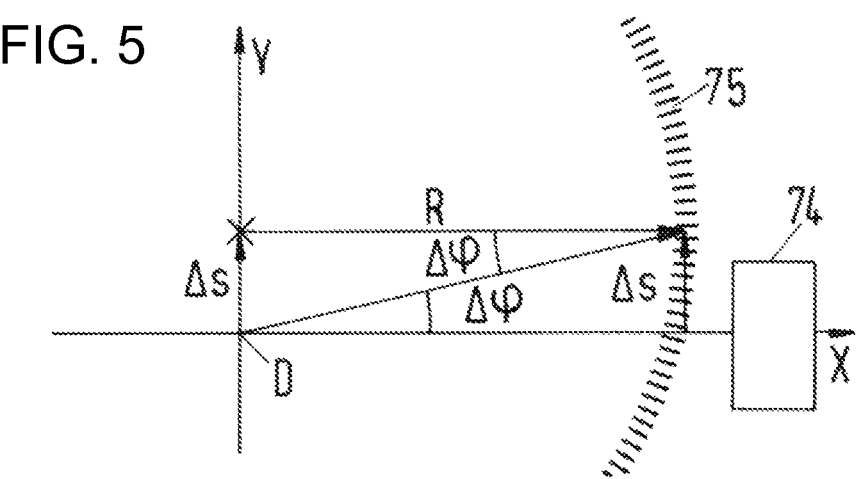
FIG. 5 shows a representation of a detail of a measuring body with a multiplicity of markings to explain the effect on the measuring signals of rotational position sensors of a translational displacement transverse to the rotational axis.

In the representation of a detail in FIG. 5, the translation vector $\Delta s$ can likewise be seen. For small amounts of the displacement, the displacement corresponds to a rotational angle $\Delta \varphi$. "Correspond" means here that, on account of the translational displacement by the translation vector $\Delta s$, the sensor 74 represented on the right in FIG. 5 supplies a measuring signal that corresponds to a rotational angle of $\Delta \varphi$. Furthermore, the radius R of the graduated disk is also represented in FIG. 5.

Figure 6:
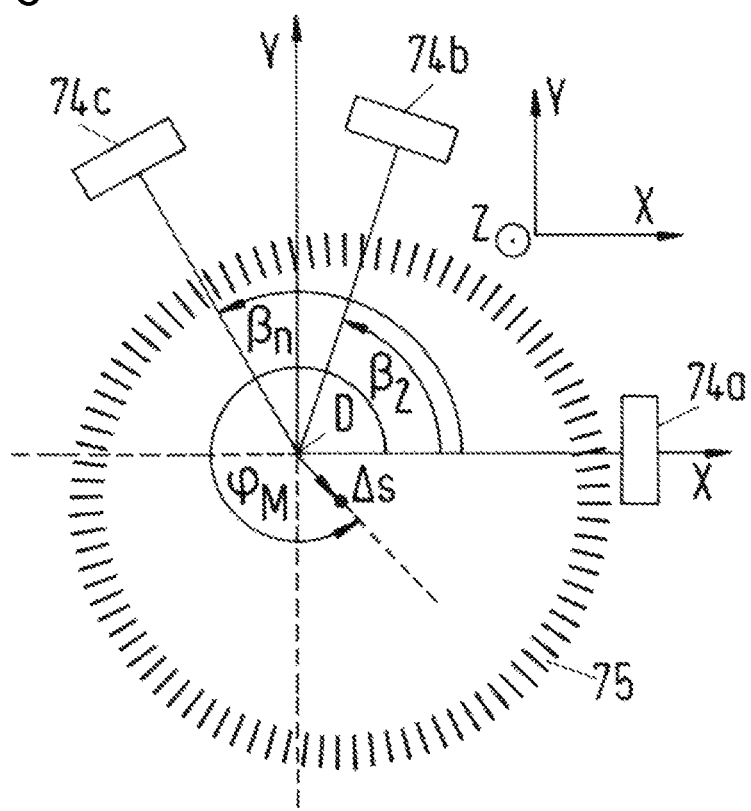
FIG. 6 shows a schematic representation of a measuring body with a multiplicity of markings, designations of physical variables and a coordinate system that are used when taking into consideration the translational movement being explained.

FIG. 6 shows the graduated disk 75 from FIGS. 3-5 or another graduated disk. The graduated disk 75 has in turn been displaced relative to the rotational axis D, and consequently in relation to the center of the arrangement of the sensors 74a, 74b, 74c, by the translation vector Δs. Furthermore, angular positions of the sensors with respect to the X axis are represented. The angular position of the first sensor 74a is zero, i.e. in the direction of the X axis the sensor is aligned with the graduated disk 75. The second sensor 74b is aligned in a direction that has been rotated by the angle $\beta_2$ with respect to the X axis. The third sensor 74c is aligned such that it is rotated by the angular interval $\beta_n$ with reference to the X axis. All of the sensors 74 (there may be a different number of sensors than three) are aligned with the axis of rotation D.

Also represented is an angular interval $\varphi_M$ (in turn with respect to the X axis), which describes the direction of the translation vector Δs with reference to the X axis. By indicating the values of this angle $\varphi_M$ and the amount of the translation vector Δs, the translational movement that the graduated disk 75 has performed from its ideal position (in which the rotational axis D lies at the center of the graduated disk 75) in a plane perpendicular to the rotational axis D can be uniquely described.

Figure 7:
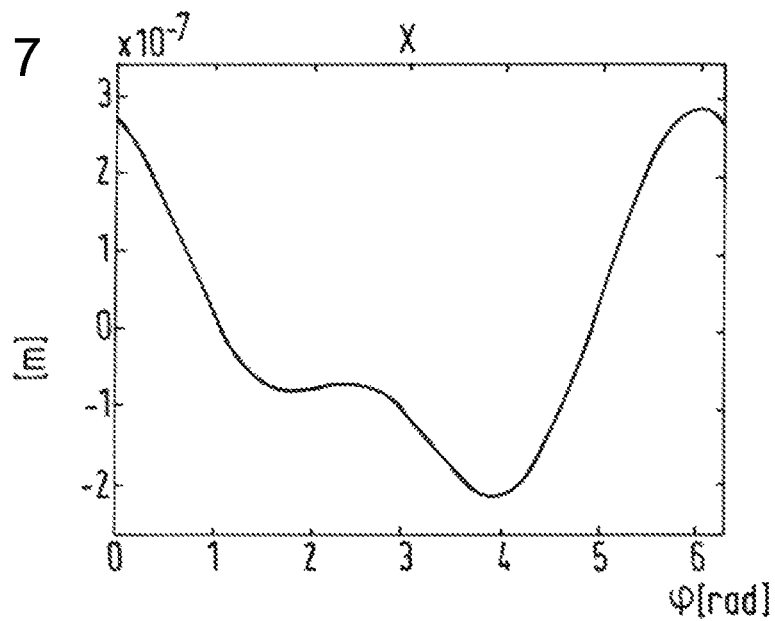
FIG. 7 shows a diagram that describes the progression of a translational movement of a part of a rotary device transverse to the rotational axis for a revolution about the rotational axis.
Figure 8:
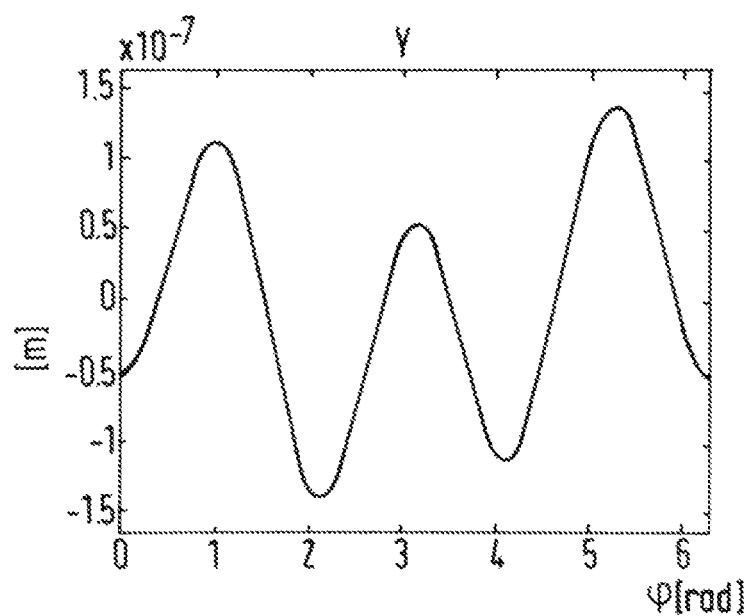
FIG. 8 shows a diagram that describes the progression of a translational movement as in FIG. 7, but for the direction of movement that runs transversely to the rotational axis and likewise transversely to the direction of translational movement from FIG. 7.

FIG. 7 and FIG. 8 show an example of the progression of a translational movement of a part of a rotary device, only the translational movement in a plane perpendicular to the rotational axis of the rotary device being considered. FIG. 7 shows the X component of the movement and FIG. 8 shows the Y component of the movement, i.e. the figures show the movement components in the direction of the X axis and in the direction of the Y axis, respectively, of a Cartesian system of coordinates. The rotational angle φ in radians is represented on the axis of the diagram running horizontally in the figures. Precisely one revolution about the rotational axis is represented. Along the axes running vertically in FIGS. 7 and 8, the value of the distance covered in the translational movement or the position in the respective direction is plotted, for example in tenths of a micrometer. These are typical values for a relatively precisely produced rotational axis for use in coordinate measuring machines.

It can be seen that the progression of the movement in the X direction has essentially one maximum and one minimum, while the progression of the movement in the Y direction has three maxima and three minima. In this case, the progression of the movement in the Y direction is for instance periodic, while the progression in the X direction has in the left-hand half of the diagram a flattened region with a virtually constant X position. Such progressions as in FIG. 7 and FIG. 8 occur reproducibly if the external conditions do not change, for example there are no changing mechanical forces.

There follows a description of exemplary embodiments of how the translational movement of parts of a rotary device relative to one another transversely to the rotational axis are taken into consideration. The method steps may be performed in particular by an evaluation device 310, which in the case of a calibrating arrangement is part of the calibrating arrangement and in the case of a coordinate measuring machine is part of the CMM. In both cases, the evaluation device may be a computer, in particular for processing digital data. The evaluation device 310 is connected to the sensors of the sensor system, in order to receive from the sensors the measuring signals or further-processed signals that have already been obtained from the measuring signals. In the case of a sensor for detecting markings, the primary measuring signal may be, for example, a pulse signal or a counter reading of the markings that have been detected by the sensor. A further-processed value obtained therefrom may be, for example, a rotational angle of a rotatable part of the rotary device that has been traveled with reference to a reference rotational position. In the case of a magnetic field vector, the primary measuring signals may be magnetic field strengths of a number of sub-sensors. A processed secondary measuring signal derived therefrom may contain the information concerning the direction of the magnetic field at the location of the magnetic field sensor. The foregoing statements not only concern the exemplary embodiments that follow, but apply generally.

First exemplary embodiment: In the calibration of a measuring arrangement 300 for determining rotational positions of a rotary device, there is for example a system of sensors and a measuring body as represented in FIG. 3 or FIG. 4. In particular as described in the aforementioned publication by Geckeler, firstly differences are formed from the rotational positions determined by the sensors. For example with reference to FIG. 3, the differences in the rotational positions supplied by the sensors 74 a, 74 b, the differences in the rotational positions supplied by the sensors 74 a, 74 c, the differences in the rotational positions supplied by the sensors 74 a, 74 d and the differences in the rotational positions supplied by the sensors 74 a, 74 e are formed. In the case of five sensors, this comprises four differences for each relative rotational position of the first and the second part of the rotary device. Alternatively, all of the possible differences in the rotational positions detected by the individual sensors may be formed, i.e. in the case of five sensors ten differences. The further method that is described in the publication by Geckeler on the basis of the equations (3) to (13) in section 3, page 2813, right-hand column, to page 2814, top of the right-hand column, may also be performed in the same way, with one distinction that is still to be discussed. The differences in the rotational positions occur in particular in Geckeler's equation (5) as what are known as differences in angle or a set of differences in angle. However, the equation is extended by terms by which the translational movement transverse to the rotational axis is taken into consideration. In the exemplary embodiment described here, the equation reads as follows:

$$\Delta\tilde{\varphi}_k(\varphi) = \tilde{\varphi}_k - \varphi = \varepsilon(\tilde{\varphi}_k) - \varepsilon(\varphi) + \beta_k - \beta_1 + \gamma_k(\varphi) - \gamma_1(\varphi) \tag{1}$$

As in the publication by Geckeler, $\Delta\tilde{\varphi}_k(\varphi)$ denotes the mentioned differences in the rotational positions that have been detected and supplied by the pairs of sensors, the pair of sensors being formed by the kth sensor and the first sensor and these differences being dependent on the rotational angle φ, i.e. on the rotational position. Here, k denotes an integer index that assumes values from 2 to M, with M being equal to the number of sensors.

$\tilde{\varphi}_k$ denotes the rotational position detected by the kth sensor. On the right-hand side of the equation, the symbols $\varepsilon(\tilde{\varphi}_k)$ and $\varepsilon(\varphi)$ denote the respective error of the measuring system (for example on account of non-ideal constant spacings of the markings in the form of lines of a graduated disk). This error is therefore not the error that is caused by the translational movement. Furthermore, the symbols $\beta_k$ and $\beta_1$ denote the angular positions of the kth and the first sensor with respect to a reference position, corresponding to the representation in FIG. 6, and the angular positions of the sensors 74 already described on the basis of FIG. 6. In particular, the angular position of the first sensor may be the reference position. Furthermore, the equation includes as the last two terms on the right-hand side the designations $\gamma_k(\varphi)$ and $\gamma_1(\varphi)$, the errors of the rotational position caused by translational movements transverse to the direction of the rotational axis. These errors $\gamma_n(\varphi)$ may be represented as follows for the nth sensor:

$$\gamma_n(\varphi) = \Delta s(\varphi) \cdot \frac{\sin(\varphi_M(\varphi) - \beta_n)}{R} \quad (2)$$

Here, $\Delta s$ is the amount of the translation vector dependent on the rotational position of the parts of the rotary device relative to one another that has already been explained on the basis of FIG. 4 to FIG. 6. As already described on the basis of FIG. 6, $\varphi_M$ is an angle that is a measure of the direction of the translation vector $\Delta s$. R is the radius, represented in FIG. 5, of the measuring body, in particular of the graduated disk 75. For example, R is the radius at which the sensors detect the markings of the measuring body. In the case of a graduated disk that is arranged coaxially in relation to the rotational axis, the individual markings of the graduated disk are all located at the distance R from the rotational axis. In the displaced state of the graduated disk, however, the center of the graduated disk is displaced with respect to the rotational axis (for example FIG. 5).

The angular position of the reference angle may for example be determined in advance by recording measured values of all the sensors in the case of a complete revolution of the rotary device. This is based on the idea that the sequence of the measuring signals of all the sensors contains the same characteristic information, from which the reference angular position can be determined, and consequently also the angular position of the sensor with respect to the reference angle. The radius R can be determined in another way (for example by direct measurement with a scale). Furthermore, the end result does not depend on the absolute value of the radius, since only rotational positions have to be determined by the sensors and, as the above equation shows, the information concerning the translation error can be determined from the ratio of the displacement $\Delta s/R$.

By entering the above equation (2) into the above equation (1), an equation corresponding to the equation (5) in the publication by Geckeler (left-hand column on page 2814) is therefore obtained. Thus, the further procedure given in the left-hand column on page 2814 in the publication by Geckeler can be followed, to be specific a Fourier transform and application of a transfer function. Geckeler's equation (9) defines the Fourier transform. In Geckeler's equations (10) and (11), the transfer function is introduced. In Geckeler's equation (12), the weighting already described above is performed.

According to the first exemplary embodiment, an error separation of the errors of the measuring system and the errors caused by the translational movement transverse to the direction of the rotational axis is then performed in the frequency domain (that is to say after the Fourier transform has been performed). The individual errors can then be calculated for example by subsequent transformation back into the spatial domain (by contrast with the Fourier-transformed frequency domain).

In a second exemplary embodiment, precisely the same procedure as in the first exemplary embodiment is followed, though the errors are not separated in the frequency domain but instead the parameters in the above equation (2) (to be specific the amount $\Delta s$ in the direction $\varphi_M$ of the translation vector of the displacement) are varied until an optimum with respect to the following condition has been found: for all of the sensors of the plurality of sensors, the product of the transfer function (Geckeler's equation (11), left-hand column on page 2814) and the Fourier transform of the difference in the rotational position measured by the sensors is the same for any desired pair of sensors. This condition is equivalent to the condition that the translational movement has no influence on the result of the method according to Geckeler, which after all does not take the translational movement into consideration and merely seeks to determine the error of the measuring system. Said product of the transfer function and the Fourier transform of the difference in the rotational positions is the subject of Geckeler's equation (10), left-hand column on page 2814. In other words, the actual translation vector is found by varying the amount and the direction of the translation vector. This iterative optimization is carried out for each rotational position of the first and the second part of the rotary device for which the translational movement is to be determined or eliminated. This is based on the idea that the translation vector is of course generally different for each rotational position of the rotary device, as shown for example by the results for an actual rotary device that are shown in FIG. 7 and FIG. 8. For example, in the iterative search or optimization, the method of simulated annealing may be applied. This is a heuristic method of optimization. An approximate solution is found. An iterative search is then carried out for the best solution to the optimization problem (here finding the direction and the amount of the translation vector) until a stopping criterion is satisfied. Alternatively, for example, a Gerchberg-Saxton optimization algorithm may be applied. In this case, the two free parameters (here the direction and the amount of the translation vector) are changed until a best possible match of the simulated result to the actual measurement data is achieved. For this match, a residual error may be defined as the stopping criterion. For the application in the case of coordinate measuring machines, this residual error may for example suitably lie in the range of one angular second or less.

Figure 10:
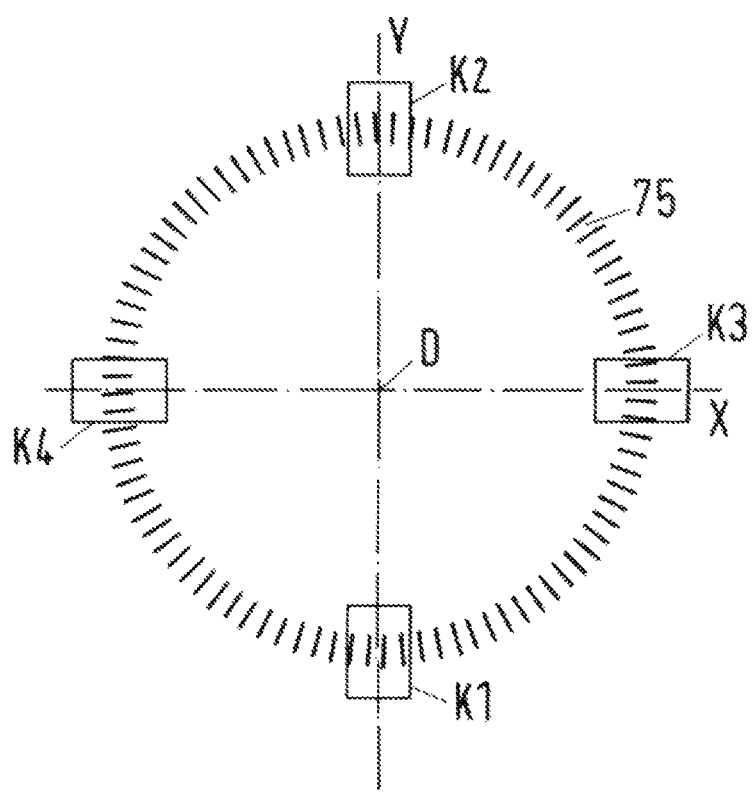
FIG. 10 shows an arrangement similar to in FIG. 3, but two sensors being respectively arranged lying opposite one another with respect to the rotational axis, and two such pairs of sensors that are arranged lying opposite one another being arranged spaced apart at a 90° angular interval relative to one another about the rotational axis.

A third exemplary embodiment concerns the matter of taking into consideration the translation error during the operation of a coordinate measuring machine, an already calibrated measuring system being taken as a basis. As represented in FIG. 10, at least two pairs of sensors K1, K2; K3, K4 are a component part of the rotary device. Furthermore, in a way similar for example to the description above on the basis of FIG. 3, the rotary device also has a measuring body that interacts with the sensors K. This in turn may be for example the already described graduated disk 75. The special feature of the sensor arrangement according to FIG. 10, as compared for example with the sensor arrangement according to FIG. 3, is that the two sensors K1, K2 and K3, K4 that respectively belong to a pair of sensors are arranged lying opposite one another with respect to the axis of rotation D, at least when the axis of rotation D lies at the center of the graduated disk or of the other measuring body. In the case of a measuring body that generates a magnetic field with just two poles, the center lies midway between the north pole and the south pole.

If the parts of the rotary device perform a translational movement relative to one another in the X direction, the sensors K1, K2 then respectively measure a corresponding displacement, but with the opposite sign. The same applies correspondingly to a translational movement in the Y direction for the sensors K3, K4. It should be recalled in this respect that the displacements detected by the sensors K are detected by means of the same measuring technique and while observing the same features of the measuring body that are also used for the determination of the rotational position. In particular, no additional markings, or indeed an additional measuring body, are required.

According to the third exemplary embodiment, therefore, merely the difference in the measuring signals or measured values derived therefrom respectively of the pair of sensors K1, K2; K3, K4 is formed in order to determine the translation movement. Alternatively, by addition of the measuring signals or measured values derived therefrom of the pair of sensors K1, K2 or K3, K4, the translational movement may be eliminated directly, without determining the translational movement.

If, for example, only three rotational position sensors are used for taking into consideration the translational movement during the current operation of the rotary device, it is not the case that each of the three sensors measures a component of the translational movement or the translational position that can be clearly assigned to a coordinate axis of the Cartesian system of coordinates. However, by simple calculation of the movement components or of the Cartesian coordinates with respect to two coordinate axes that run perpendicularly to one another and perpendicularly to the rotational axis, a conversion is easily possible. In this case, the desired Cartesian coordinates can be calculated for example by using the angular positions of the rotational position sensors by means of simple trigonometric relationships.

Figure 9:
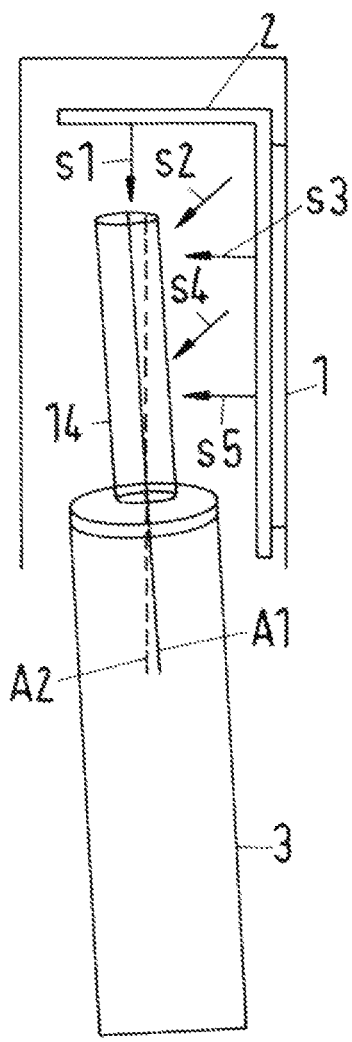
FIG. 9 shows a schematic representation of a rotary device with a measuring system for determining mechanical faults of the rotary device, i.e. for determining deviations of the rotational movement from an ideal rotational movement about a rotational axis.

FIG. 9 schematically shows a rotary device with a measuring system that has a plurality of sensors, to be specific in the exemplary embodiment five sensors, which in turn are schematically represented by arrows. In this case, the direction of the arrows reproduces the alignment of the sensor, i.e. the range of detection of the respective sensor s1, s2, s3, s4, s5 is in the direction of the arrow. The rotary device has a first part 1 and a second part 3, which are rotatable relative to one another about a rotational axis A1. In the exemplary embodiment, the second part 3 is a cylindrical body, which is for instance formed rotationally symmetrically in relation to the rotational axis A1. It has at its upper end a further cylindrical body 14 with a smaller outside diameter, which likewise runs coaxially in relation to the rotational axis A1.

As FIG. 9 shows, the rotational axis A1 is however aligned such that it is tilted with respect to a second axis A2. This second axis A2 is an axis of symmetry of the first part 1. Without the tilting of the axes A1, A2 with respect to one another, the measuring body 14 would perform an ideal rotational movement about the second axis A2 when there is a rotational movement about the rotational axis A1. The sensors mentioned are attached to the first part 1 by way of a holder 2 on the first part 1 and are aligned with said ideal position of the measuring body 14. However, even with the tilting of the axes, the sensors are capable of supplying measured values.

Sensor s1 is configured to measure a relative position, in particular a distance, between the sensor s1 and the assigned measuring body 14 in the axial direction (i.e. in the direction of the axis A2). The sensors s2, s3 and s4, s5 are located at various axial positions of the axes A1, A2. According to the specific embodiment described here, the sensors are configured to measure rotational positions of the measuring body 14 relative to the sensors. For this purpose, there are, for example, running around the outer circumference of the measuring body 14, a multiplicity of markings, for example markings in the form of lines that run parallel to the rotational axis A1. In this case, the sensors s2 to s5 are optical sensors. Other configurations of the measuring body are possible.

The representation in FIG. 9 should be understood as being schematic. In practice, it is preferred that not just two sensors s2, s3; s4, s5 but at least three of the rotational position sensors are arranged at each axial position. Therefore, at each axial position the rotational position of the parts 1, 3 relative to one another and also, in accordance with the invention, the translational relative position or relative movement can be determined or eliminated from the results of the measurement. Since, in practice, the determination of the rotational position at one axial position of the rotational axis A1 is sufficient, in a variant of the arrangement shown in FIG. 9 a plurality of the rotational position sensors are merely arranged at one axial position and a set of distance sensors, which merely detect the distance between the sensor and the measuring body 14, is provided at the other axial position (for example with the sensors s2, s3). Furthermore, it is possible that there are both distance sensors and rotational position sensors at at least one of the two axial positions. In this case, it is even possible to obtain redundant information concerning the translational position.

Further modifications of the measuring system shown in FIG. 9 are possible. For example, the cylindrical rod 14 does not have to have a cylinder surface with a constant diameter throughout in the axial direction. Rather, cylindrical regions of the rod may be formed at the axial positions at which the measuring bodies K1, K2 are located according to FIG. 9, the rod otherwise being differently shaped, for example having a smaller outside diameter.

Figure 9A:
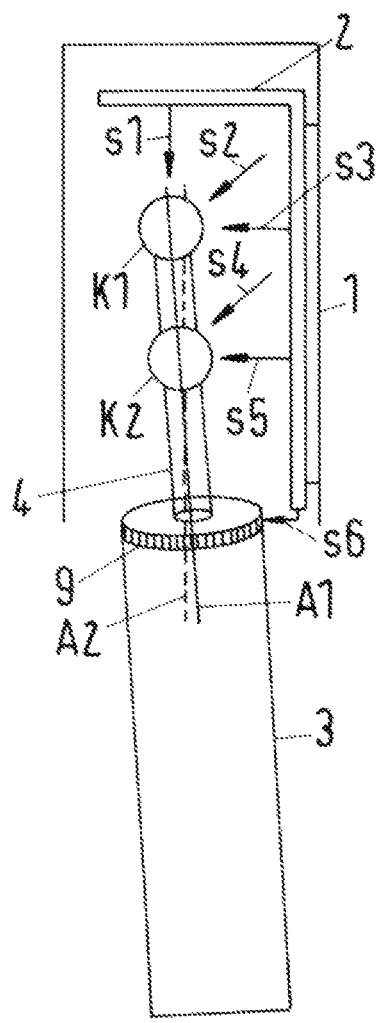
FIG. 9a shows a further schematic representation of a rotary device similar to that in FIG. 9, a measuring system with a sensor for measuring the rotational position of the parts that are movable relative to one another being provided along with a variant of the measuring system from FIG. 9.

With the measuring system according to FIG. 9 or with any variant of the measuring system according to FIG. 9 there may be combined a further measuring system for measuring the rotational position of the first and the second part of the rotational device relative to one another. This is then schematically illustrated by FIG. 9a. A variant of the measuring system that is represented in FIG. 9 for determining five degrees of freedom of movement is represented there. Instead of the cylindrical measuring body 14, a rod-shaped element 4, which in the axial direction extends approximately over the same length as the cylindrical measuring body 14 according to FIG. 9, is connected to the second part 3. Configured and/or arranged on the rod-shaped element 4 are two spherical measuring bodies K1, K2. Interacting with the first measuring body K1 are the sensors s1 to s3. Interacting with the second measuring body K2, which is located in a different axial position than the first measuring body K1, are the sensors s4, s5. The function of the sensors s1 to s5 is, in particular, the same as already mentioned with reference to FIG. 9. Hereinafter, the measuring system with the sensors s1 to s5, K1, K2 is referred to as the additional measuring system, since it is used for the correction of measuring results of a further measuring system, which serves for the determination of the rotational position of the first part 1 relative to the second part 3. For example, as FIG. 9a shows, a graduated disk 9 is arranged as the measuring body at the upper end of the second part 3, where the rod-shaped element 4 adjoins. Also arranged on the carrier 2 is a further sensor s6, which is a rotational position sensor for determining the rotational position. This rotational position measuring system may, however, also be configured differently. For example, the markings of the graduated disk may not be formed as shown on the outer circumference of a cylindrical measuring body, but on the surface of a measuring body that extends transversely to the rotational axis. As already mentioned, magnetic markings could also be present, and the at least one rotational positional sensor could be correspondingly configured as a magnetic field sensor. Further variants are possible.

Since the translational position and/or movement of the first part 1 relative to the second part 3 is detected by the sensors s2 to s5 at various axial positions with respect to the rotational axis A1, the translational movement may be determined at the location of the graduated disk or of the rotational position measuring system. "At the location" means in this case at the corresponding axial position of the rotational position measuring system. This derived information concerning the translational movement at the location of the rotational position measuring system is then used for correcting the measuring signals of the at least one rotational position measuring sensor s6 and/or of measured values derived therefrom. Examples have already been discussed.

Figure 11:
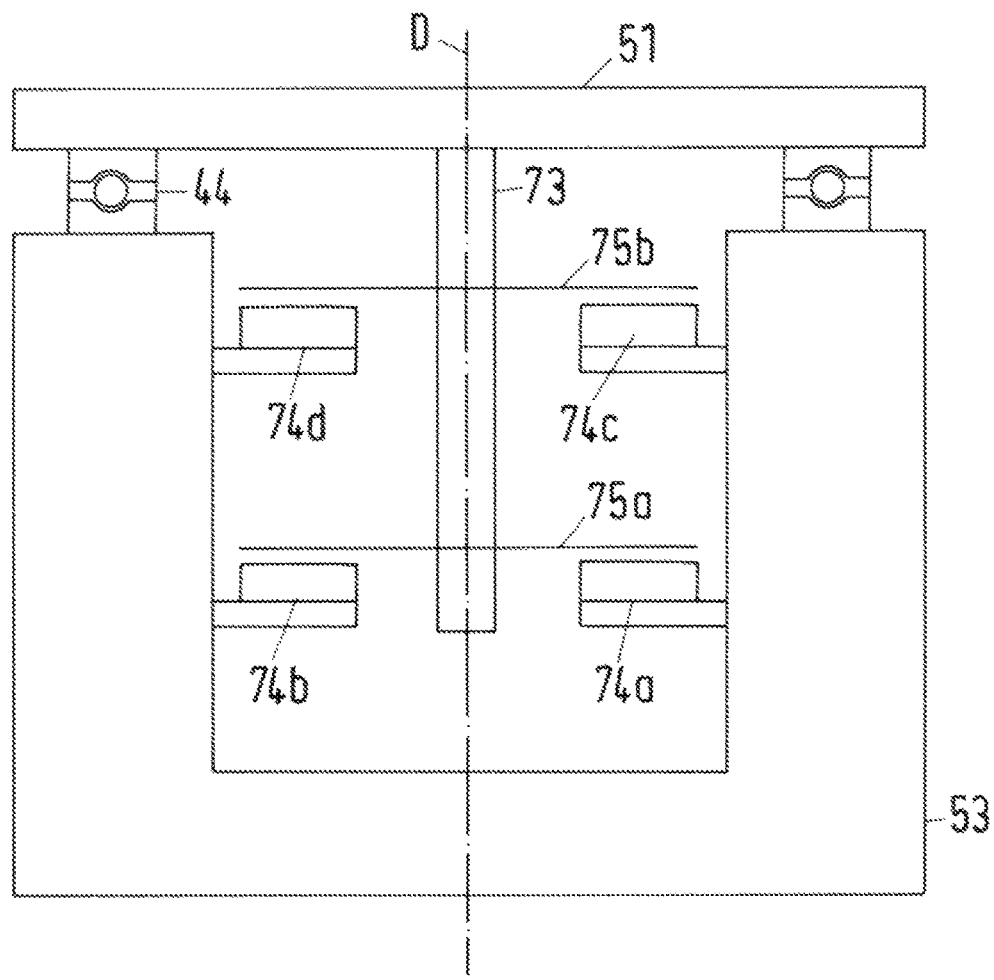
FIG. 11 shows a schematic representation of a rotary device in the form of an axial longitudinal section, the rotary device having sensors for determining the rotational position at various axial positions of the rotational axis.

FIG. 11 shows a stator 53 and a rotor (rotatable part) 51 as parts of a rotary device, which are coupled to one another by way of a rotation bearing 44. From the rotor 51, a rod-shaped carrier 73 protrudes downwardly into the cavity of the stator 53, the rod-shaped carrier 73 being attached to the rotor 51 for rotation therewith and being arranged coaxially in relation to the rotational axis D of the rotary device. At various axial positions with respect to the rotational axis D, the rod 73 respectively carries a disk 75a, 75b, which has, for example as shown in FIG. 3, a structure with a multiplicity of markings 82, which are arranged at a distance from one another on the disk or at the disk. These markings that are spaced apart from one another may consequently be referred to as a grid, in the case of markings in the form of lines as a grid of lines.

The sensors 74a, 74b and 74c, 74d are arranged at positions lying opposite one another with respect to the rotational axis D. Each of the sensors 74a, 74b; 74c, 74d is configured to determine the rotational position of the rotor 51 and of the stator 53 relative to one another, in particular by the markings on the disks 75a, 75b being detected. Preferably, a further pair of sensors is arranged at each of the two axial positions with respect to the rotational axis D, so that, in an axial plan view similar to FIG. 10, two of the sensors respectively lie opposite one another with respect to the rotational axis D. It is therefore possible with the arrangement shown in FIG. 11 to determine, take into consideration and/or eliminate the effects of the translational movements of the parts 51, 53 of the rotary device perpendicular to the direction of the rotational axis D. In particular, therefore, wobble and radial run-out can be determined.

Figure 12:
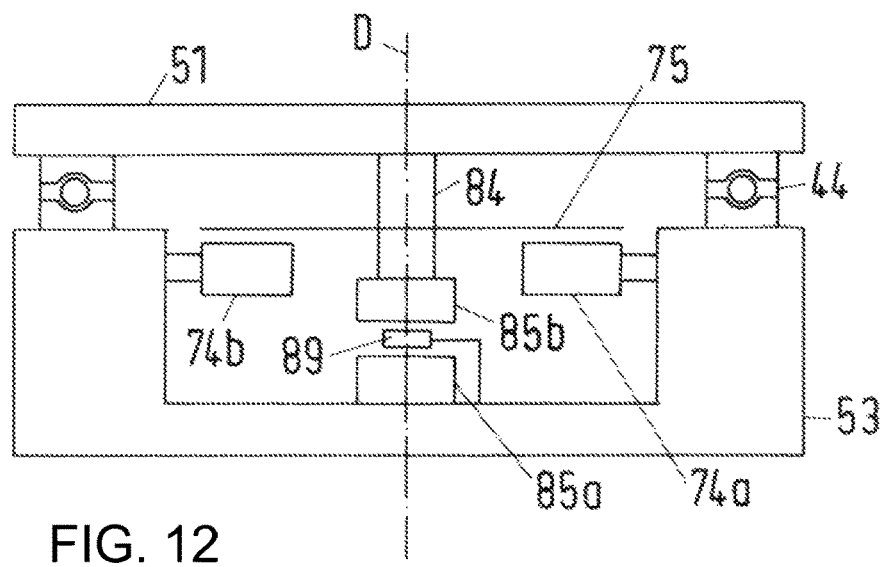
FIG. 12 shows a schematic representation similar to that in FIG. 11, but there only being a disk-shaped measuring body that is assigned to a plurality of sensors for determining the rotational position arranged at one axial position of the rotational axis.

FIG. 12 shows a structure similar to that in FIG. 11, though an arrangement with a plurality of sensors 74 is only provided at one axial position of the rotational axis D. This in turn preferably comprises four sensors for detecting the rotational position of the disk 75, which are arranged as represented in the plan view of FIG. 10. In addition, a measuring system for determining the axial position of the rotor 51 relative to the stator 53 is provided. The relatively long rod-shaped carrier 71 of the embodiment according to FIG. 11 is replaced in the embodiment according to FIG. 12 by a shorter rod-shaped carrier 84, which likewise carries the disk 75. A first magnet 85b is also arranged at its lower, free end. A second magnet 85a is arranged underneath the first magnet 85b, on the bottom of the stator 53. Between the magnets 85 there is a sensor 89 at an axial distance from both magnets 85, the sensor 89 likewise being attached to the stator 53. On account of the two magnets 85, a particularly strong magnetic field is generated at the location of the sensor 89, so that the local resolution in the measurement of the axial position is particularly high. However, the lower magnet 85a is not absolutely necessary.

Figure 13:
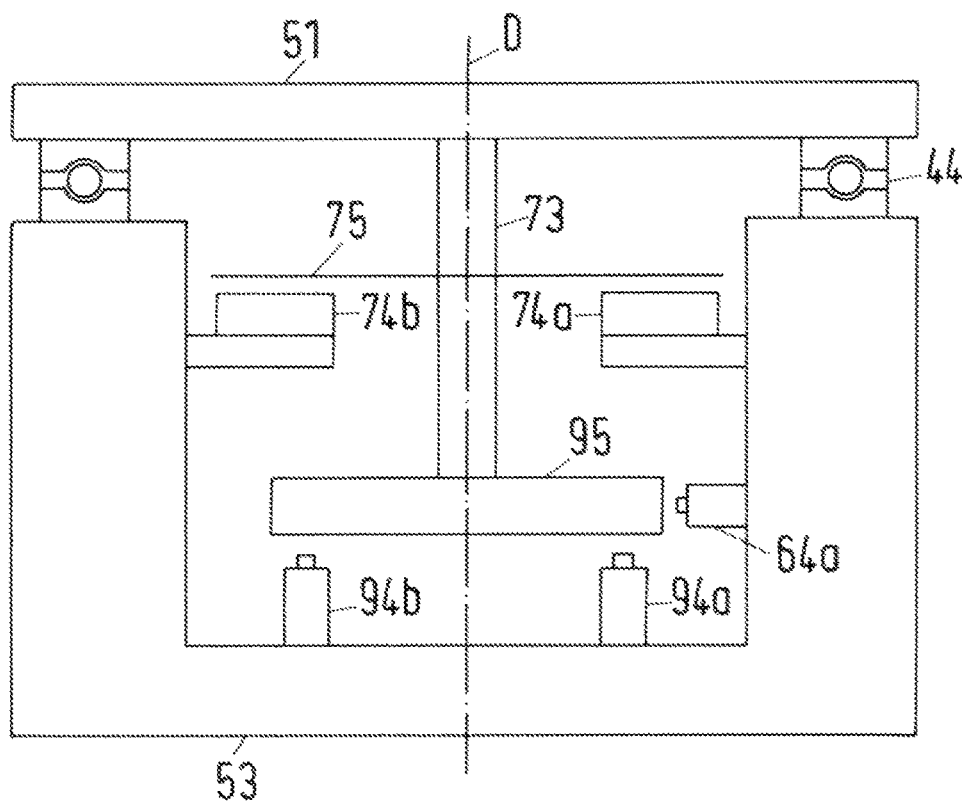
FIG. 13 shows a schematic representation of a further variant of a rotary device, a measuring body for a different kind of measuring system being arranged at a second axial position of the rotational axis.

FIG. 13 shows a combination of two different measuring systems or measuring sub-systems. The stator 53, the rotational bearing 44, the rotor 51 together with the downwardly protruding rod-shaped carrier 73 and the upper measuring sub-system with the disk 75 are configured as in FIGS. 11 and 12, though the rod-shaped carrier is shorter in the axial direction than in FIG. 11 and does not carry a magnet, but instead just the disk 75 and, at its lower end, an additional measuring body 95. This additional measuring body 95 has a cylindrical disk, aligned with the circumferentially running outer periphery of which is a first sensor 64a for determining the radial relative position between the cylindrical disk 95 and the stator 53. Furthermore, two sensors 94a, 94b, which are aligned with a planar surface of the cylindrical disk 95 in the axial direction, i.e. parallel to the direction of the rotational axis D, are connected to the stator 53. These two sensors 94 allow not only the determination of the axial relative position between the cylindrical disk 95, and consequently the rotor 51, on the one hand, and the stator 53, on the other hand, but also the determination of the wobble.

Figure 14:
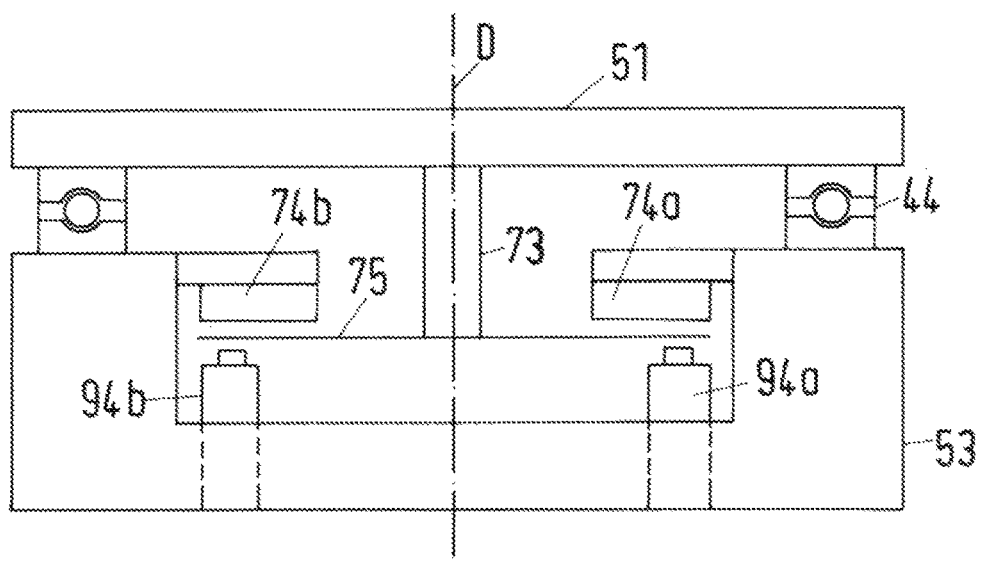
FIG. 14 shows yet a further schematic representation of a rotary device similar to that in FIG. 11 to FIG. 13, but the disk-shaped measuring body being used not only by a plurality of sensors for determining the rotational position but also by further sensors for determining the axial position in the direction of the rotational axis.

An embodiment of a particularly low construction, i.e. the extent along the rotational axis D is particularly small, is represented in FIG. 14. There is in turn a measuring system with a disk 75, which is arranged on the rod-shaped carrier 73 of the rotor 51 and carries a multiplicity of markings. However, the assigned rotational position sensors 74 are arranged on the one axial side (to be specific on top in FIG. 14) of the disk 75. On the opposite axial side of the disk 75, to be specific on the bottom in FIG. 14, two sensors 94a, 94b are arranged in a way similar to in FIG. 13 in the lower measuring sub-system. These sensors 94 are aligned parallel to the rotational axis D. These two sensors 94 in turn allow the determination of the axial relative position of the stator 53 and the rotor 51 and also (together with the upper measuring system) the determination of the wobble.

The invention claimed is:

1. A method of calibrating a measuring arrangement including a rotary device and at least one of a plurality of sensors for determining rotational positions of the rotary device, the rotary device having a first part and a second part, the first part and the second part being rotatable about a rotational axis with respect to each other, the method comprising:

providing at least one measuring body;

detecting, with the sensors, measured values of rotational positions of the first part and the second part relative to one another in various rotational positions of the rotary device, the sensors being arranged at various angular positions distributed around the rotational axis;

generating, for each of the sensors, a measuring signal corresponding to a respectively detected rotational position of the measuring body, thereby obtaining redundant information concerning each of the rotational positions of the rotary device;

providing a calculation model in which differences in the rotational positions detected by the sensors and the redundant information are expressed by:

translational errors, assigned to a respective sensor, of a detected rotational position that are caused by a translational movement transverse to an extent of the rotational axis;

measuring errors of the measuring arrangement that are not errors caused by the translational movement; and angular positions of the sensors about the rotational axis;

with an evaluation device, determining from the calculation model the translational errors assigned to the respective sensor and the measuring errors of the measuring arrangement and calibrating the measuring arrangement while taking into consideration the translational errors and the measuring errors of the measuring arrangement; and calibrating at least a part of the measuring arrangement by obtaining calibrating information from the redundant information, wherein the calibrating allows actual rotational positions of the first part and second parts relative to one another to be determined from the measuring signals of the respective sensor.

2. The method according to claim 1, which comprises determining solutions of the calculation model iteratively by applying a prescribed optimization algorithm, wherein parameter values are fixed in each iteration step and, according to the optimization algorithm, new parameter values are found for a next iteration step respectively.

3. The method according to claim 2, which comprises carrying out an iterative search for a best solution of the calculation model until a stopping criterion is satisfied.

4. A method of operating a rotary device, wherein the rotary device has a first part and a second part, the first part and the second part being rotatable about a rotational axis with respect to each other, the method comprising:

providing at least one measuring body;

detecting, with a plurality of sensors, measured values of rotational positions of the first part and the second part relative to one another in various rotational positions of the rotary device, the sensors being distributed around the rotational axis;

generating, for each of the sensors, a measuring signal corresponding to a respectively detected rotational position of the measuring body, thereby obtaining redundant information concerning each of the rotational positions of the rotary device;

providing a calculation model in which differences in the rotational positions detected by the sensors and the redundant information are expressed by:

translational errors, assigned to a respective sensor, of a detected rotational position that are caused by a translational movement transverse to an extent of the rotational axis;

measuring errors of a measuring arrangement, which includes the rotary device and at least one of the plurality of sensors, that are not errors caused by the translational movement; and angular positions of the sensors about the rotational axis;

with an evaluation device, determining from the calculation model the translational errors assigned to the respective sensor and the measuring errors of the measuring arrangement; and using the translational errors from the calculation model to correct errors in the measured values detected with the plurality of sensors, wherein the errors in the measured values detected with the plurality of sensors are caused by the translational movement of the first part and the second part relative to each other.

5. The method according to claim 4, wherein the rotary device is a component part of a coordinate measuring machine for measuring coordinates of a workpiece, and the method comprises:

rotating the first and second parts relative to one another by a rotational movement about a rotational axis and thereby setting a position and/or alignment of a coordinate measuring device of the coordinate measuring machine, obtaining the redundant information from rotational positions of the first and second parts relative to one another that are detected by the sensors directly before, during and/or directly after the rotational movement; and taking into account effects of the translational movement in a determination of coordinates of the workpiece that is measured by the coordinate measuring device in a currently set position and/or alignment of the coordinate measuring device.

6. The method according to claim 4, which comprises determining solutions of the calculation model iteratively by applying a prescribed optimization algorithm, wherein parameter values are fixed in each iteration step and, according to the optimization algorithm, new parameter values are found for a next iteration step respectively.

7. The method according to claim 6, which comprises carrying out an iterative search for a best solution of the calculation model until a stopping criterion is satisfied.

8. A calibrating assembly for calibrating a measuring arrangement including a rotary device and at least one of a plurality of sensors for determining rotational positions of the rotary device that has a first part and a second part, the first part and the second part being rotatable about a rotational axis with respect to each other, the calibrating assembly comprising:

the plurality of sensors distributed about the rotational axis and arranged on said first part;

at least one measuring body disposed on said second part and assigned to at least one of said sensors, each said sensor being configured to generate a measuring signal in accordance with a rotational position of the measuring body, and consequently in accordance with a relative rotational position of the first and second parts;

an evaluation device connected to said sensors for receiving measuring signals of said sensors and configured to use a calculation model in which differences in rotational positions detected by said sensors and redundant information concerning each of the rotational positions are expressed by:

translational errors, assigned to a respective sensor, of a detected rotational position that are caused by a translational movement transverse to an extent of the rotational axis;

measuring errors of the measuring arrangement that are not errors caused by the translational movement; and angular positions of the sensors about the rotational axis;

said evaluation device being configured to determine the translational errors assigned to the respective sensor and the measuring errors of the measuring arrangement from the calculation model and to correct the translational errors and the measuring errors of the measuring arrangement for an operation of the rotary device;

wherein said evaluation device is configured to calibrate the measuring system by obtaining from the detected rotational positions calibrating information, wherein the calibrating allows actual rotational positions of the first part and the second part relative to one another to be determined from the measuring signals of the respective sensor.

9. The calibrating assembly according to claim 8, wherein said evaluation device is configured to determine solutions of the calculation model iteratively by applying a prescribed optimization algorithm, wherein parameter values are fixed in each iteration step and, according to the optimization algorithm, new parameter values are found for the next iteration step respectively.

10. The calibrating assembly according to claim 8, wherein said evaluation device is configured to carry out an iterative search for a best solution of the calculation model until a stopping criterion is satisfied.

11. A rotary device, comprising:
- a first part and a second part, said second part rotatably disposed for rotation about a rotational axis relative to said first part;
- a plurality of sensors distributed about the rotational axis and respectively arranged on said first part;
- at least one measuring body disposed on said second part and assigned to at least one of said sensors, each said sensor being configured to generate a measuring signal in accordance with a rotational position of the measuring body, and consequently in accordance with a relative rotational position of said first and second parts;
- an evaluation device connected to said sensors for receiving measuring signals of said sensors and configured to use a calculation model in which differences in rotational positions detected by said sensors and redundant information concerning each of the rotational positions are expressed by:
  - translational errors, assigned to a respective sensor, of a detected rotational position that are caused by a translational movement transverse to an extent of the rotational axis;
  - measuring errors that are not errors caused by the translational movement; and
  - angular positions of the sensors about the rotational axis;
- and said evaluation device being further configured to determine the translational errors assigned to the respective sensor and the measuring errors from the calculation model, said evaluation device configured to use the translational errors from the calculation model to correct errors in the measuring signals generated by said sensors, wherein the errors in the measured values detected with the plurality of sensors are caused by the translational movement of the first part and the second part relative to each other.

12. The rotary device according to claim 11, wherein said evaluation device is configured to determine solutions of the calculation model iteratively by applying a prescribed optimization algorithm, wherein parameter values are fixed in each iteration step and, according to the optimization algorithm, new parameter values are found for the next iteration step respectively.

13. The rotary device according to claim 12, wherein said evaluation device is configured to carry out an iterative search for a best solution of the calculation model until a stopping criterion is satisfied.

14. A coordinate measuring machine, comprising:
- a rotary device according to claim 11 having the first part or the second part thereof connected to a coordinate measuring device for measuring coordinates of a workpiece;
- wherein a position and/or alignment of the coordinate measuring device can be set by a rotational movement of the first part and the second part relative to one another;
- wherein the evaluation device is configured to take into consideration the effects of the translational movement of the first and the second part relative to one another in a determination of coordinates of the workpiece.

* * * * *